US012616197B2

(12) United States Patent
Discekici et al.

(10) Patent No.: US 12,616,197 B2
(45) Date of Patent: May 5, 2026

(54) THREE-DIMENSIONAL PRINTING

(71) Applicant: PERIDOT PRINT LLC, Palo Alto, CA (US)

(72) Inventors: Emre Hiro Discekici, San Diego, CA (US); Shannon Reuben Woodruff, San Diego, CA (US); Graciela E. Negri Jimenez, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 59 days.

(21) Appl. No.: 18/689,056

(22) PCT Filed: Sep. 29, 2021

(86) PCT No.: PCT/US2021/052568
§ 371 (c)(1),
(2) Date: Mar. 4, 2024

(87) PCT Pub. No.: WO2023/055352
PCT Pub. Date: Apr. 6, 2023

(65) Prior Publication Data
US 2024/0389584 A1 Nov. 28, 2024

(51) Int. Cl.
*A01N 37/40* (2006.01)
*B29C 64/165* (2017.01)
(Continued)

(52) U.S. Cl.
CPC ............ *A01N 37/40* (2013.01); *B29C 64/165* (2017.08); *B33Y 10/00* (2014.12); *B33Y 70/00* (2014.12);
(Continued)

(58) Field of Classification Search
CPC ...... A01N 37/40; B29C 64/165; B33Y 10/00; B33Y 70/00; B33Y 80/00; B29K 2995/0077
See application file for complete search history.

(56) References Cited

U.S. PATENT DOCUMENTS 7,578,874 B2 * 8/2009 Benjamin ............ B41J 2/17593 106/31.29
9,523,160 B2 12/2016 Kim et al.
(Continued)

FOREIGN PATENT DOCUMENTS

CN 106009928 A 10/2016
CN 104721061 B 8/2017
(Continued)

OTHER PUBLICATIONS

Davia-Aracil et al.,"3D Printing of Functional Anatomical Insoles", Computers in Industry, vol. 95, 2018, p. 38-53 (Published online Dec. 6, 2017).
(Continued)

*Primary Examiner* — Nahida Sultana
(74) *Attorney, Agent, or Firm* — Dierker & Kavanaugh, P.C.

(57) ABSTRACT

An agent for three-dimensional (3D) printing includes at least 3 wt % active, based on a total weight of the agent, of a paraben selected from the group consisting of methyl paraben, ethyl paraben, propyl paraben, butyl paraben, isopropyl paraben, isobutyl paraben, heptyl paraben, benzyl paraben, salts thereof, and combinations thereof; and an aqueous vehicle. The aqueous vehicle includes up to 85 wt % active, based on the total weight of the agent, of a co-solvent package including at least one co-solvent present in an amount sufficient to increase a solubility of the paraben in the aqueous vehicle; and a balance of water.

15 Claims, 4 Drawing Sheets

(51) Int. Cl.
*B33Y 10/00* (2015.01)
*B33Y 70/00* (2020.01)
*B33Y 80/00* (2015.01)

(52) U.S. Cl.
CPC ....... *B29K 2995/0077* (2013.01); *B33Y 80/00* (2014.12)

(56) References Cited

U.S. PATENT DOCUMENTS

| | | | | |
|---|---|---|---|---|
| 2005/0059757 | A1 | 3/2005 | Bredt et al. | |
| 2007/0191321 | A1* | 8/2007 | Ahmed | A61P 3/02 514/169 |
| 2010/0263793 | A1* | 10/2010 | Ylitalo | C08F 299/00 428/173 |
| 2012/0142532 | A1* | 6/2012 | Wright | A01N 25/32 504/144 |
| 2012/0193829 | A1 | 8/2012 | Ikeuchi et al. | |
| 2013/0273131 | A1 | 10/2013 | Frangov et al. | |
| 2015/0141242 | A1* | 5/2015 | Xu | A01N 25/30 504/100 |
| 2021/0196638 | A1* | 7/2021 | Deng | B33Y 10/00 |
| 2023/0390193 | A1* | 12/2023 | Deng | A61K 9/0065 |
| 2024/0041779 | A1* | 2/2024 | Deng | B33Y 10/00 |

FOREIGN PATENT DOCUMENTS

| | | | |
|---|---|---|---|
| WO | 2018/199955 | A1 | 11/2018 |
| WO | 2019/201922 | A1 | 10/2019 |
| WO | 2020/251661 | A1 | 12/2020 |

OTHER PUBLICATIONS

Flisyuk et al., "Preservatives in drug technology", Educational and Methodological Manual, 2013, pp. 6-7, 9-10, non-official translation.

Gonzalez-Henriquez et al., "Antimicrobial Polymers for Additive Manufacturing", International Journal of Molecular Science, Mar. 10, 2019, vol. 20, No. 5, 26 pages. DOI: 10.3390/ijms20051210.

Yue et al., "3D-Printable Antimicrobial Composite Resins", Advanced Functional Materials, 2015, vol. 25, No. 43, p. 6756-6767. DOI: 10.1002/adfm.201502384.

* cited by examiner

THREE-DIMENSIONAL PRINTING

BACKGROUND

Three-dimensional (3D) printing is an additive manufacturing process used to make three-dimensional solid parts from a digital model. 3D printing techniques are considered additive manufacturing processes because they involve the application of successive layers of material (which, in some examples, may include build material, binder and/or other printing liquid(s), or combinations thereof). This is unlike traditional machining processes, which often rely upon the removal of material to create the final part. 3D printing is often used in rapid product prototyping, mold generation, mold master generation, and short run manufacturing for mass personalization and customization of goods.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
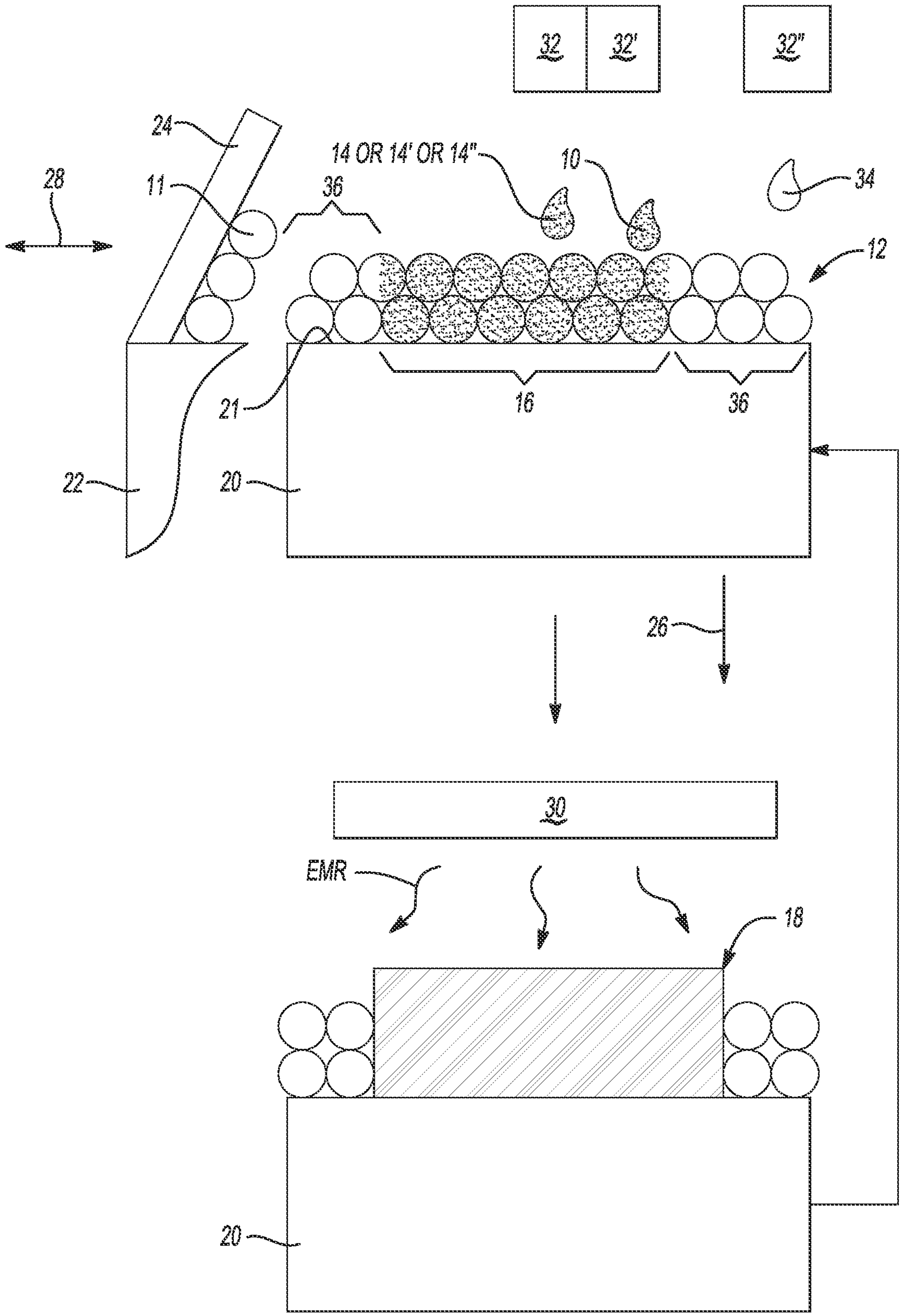
FIG. 1 is a schematic diagram illustrating an example 3D printing technique.

Some examples of three-dimensional (3D) printing may utilize a fusing agent (including an electromagnetic radiation absorbing material) to pattern polymeric build material. In these examples, an entire layer of the polymeric build material is exposed to electromagnetic radiation, but the patterned region (which, in some instances, is less than the entire layer) of the polymeric build material is fused/coalesced and hardened to become a layer of a 3D part. In the patterned region, the fusing agent is capable of at least partially penetrating into voids between the polymeric build material particles, and is also capable of spreading onto the exterior surface of the polymeric build material particles. This fusing agent is capable of absorbing radiation and converting the absorbed radiation to thermal energy, which in turn fuses/coalesces the polymeric build material that is in contact with the fusing agent. Fusing/coalescing causes the polymeric build material to join or blend to form a single entity (i.e., the layer of the 3D part). Fusing/coalescing may involve at least partial thermal merging, melting, binding, and/or some other mechanism that coalesces the polymeric build material to form the layer of the 3D printed polymeric object.

An agent is disclosed herein that can be used to impart anti-microbial characteristics to the 3D printed polymeric object. Thus, this agent may be referred to herein as an anti-microbial agent. The agent includes a paraben and a co-solvent package that increases the paraben's solubility in water, which renders it particularly suitable for incorporation into an aqueous vehicle. The resulting agent can be dispensed from an inkjet printhead, which enables the agent, and thus the paraben, to be controllably applied at the voxel level. At least some of the paraben remains in the 3D printed polymeric object after solvent removal and coalescence. As little as 0.2 wt % of the paraben can provide significant anti-microbial resistance against a variety of different bacteria strains. The mitigation of microbe growth can also mitigate malodor. Thus, the agent disclosed herein may be useful in generating a variety of 3D printed polymeric objects, such as, for example, orthotics and other footwear applications.

Throughout this disclosure, a weight percentage that is referred to as "wt % active" refers to the loading of an active component of a dispersion or other formulation that is present, e.g., in the agent, fusing agent, etc. For example, a surfactant may be present in a water-based formulation (e.g., stock solution or dispersion) before being incorporated into the agent vehicle. In this example, the wt % actives of the surfactant accounts for the loading (as a weight percent) of the surfactant molecules that are present in the agent, and does not account for the weight of the other components (e.g., water, etc.) that are present in the stock solution or dispersion with the surfactant molecules. The term "wt %," without the term actives, refers to the loading (in the fusing agent, etc.) of a 100% active component that does not include other non-active components therein.

Anti-Microbial Agent

The agent (i.e., anti-microbial agent) disclosed herein includes at least 3 wt % active, based on a total weight of the agent, of a paraben selected from the group consisting of methyl paraben, ethyl paraben, propyl paraben, butyl paraben, isopropyl paraben, isobutyl paraben, heptyl paraben, benzyl paraben, salts thereof, and combinations thereof; and an aqueous vehicle including up to 85 wt % active, based on the total weight of the agent, of a co-solvent package including at least one co-solvent present in an amount sufficient to increase a solubility of the paraben in the aqueous vehicle and a balance of water.

The paraben is at least partially soluble in the aqueous vehicle. The phrase "at least partially soluble" means that at least 0.5 wt % of paraben is able to dissolve in the aqueous vehicle. The paraben may be partially soluble in the water of the aqueous vehicle, and the co-solvent package disclosed herein may be used to increase the solubility. As such, the paraben may not be fully dissolved in water, but may be soluble in one or more co-solvents of the co-solvent package, which renders the paraben miscible in water. Thus, the inclusion of the paraben can still result in a suitable, jettable anti-microbial agent when combined with the co-solvent package.

For example, increasing the amount of an alcohol co-solvent may increase the miscibility and/or solubility of the paraben in the aqueous vehicle, thus maintaining the viscosity of the agent within a jettable range.

As used herein, "jettable" means that the agent has a suitable viscosity for being dispensed from a particular type of printhead. When the agent is to be dispensed from a thermal inkjet printhead, the viscosity of the agent may range from about 1 cP to about 9 cP (at 20° C. to 25° C.). When the agent is to be dispensed from a piezoelectric printhead, the viscosity of the agent may be range from about 2 cP to about 20 cP (at 20° C. to 25° C.), depending on the type of the printhead that is being used (e.g., low viscosity printheads, medium viscosity printheads, or high viscosity printheads).

The paraben is an ester of p-hydroxybenzoic acid having the structure:

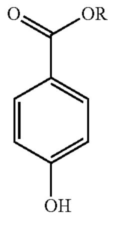

where R is an alkyl group having from 1 carbon to 7 carbons, an isopropyl group, an isobutyl group, or —$CH_2$—($C_6H_5$) (i.e., a benzyl group attached through a carbon atom). Salts, such as sodium salts, potassium salts, etc., of any of these parabens may also be used.

The amount of the paraben present in the anti-microbial agent will depend, in part, upon its solubility in the aqueous vehicle and its effect on the jettability of the agent. The paraben may be present in an amount of at least 3 wt % active, based on the total weight of the anti-microbial agent. In an example, the paraben is present in an amount ranging from at least 3 wt % active to about 15 wt % active based on the total weight of the agent. In another example, the paraben is present in an amount ranging from at least 3 wt % active to about 12 wt % active based on the total weight of the agent.

In addition to the paraben, the agent includes the aqueous vehicle. The aqueous vehicle includes up to 85 wt % active of a co-solvent package including at least one co-solvent present in an amount sufficient to increase a solubility of the paraben in the aqueous vehicle, and a balance of water. The amount of the co-solvent that is sufficient to increase the solubility of the paraben in the aqueous vehicle will depend, in part, upon the amount of paraben to be added and the paraben's solubility in one or more of the solvents in the co-solvent package. Any solvent that has a higher solubility of the paraben than water may be added in an amount that enables at least 0.5 wt % of the total amount of paraben that is to be included in the anti-microbial agent to dissolve. As an example, the solubility of methyl paraben in water is 2.5 g/L and in ethanol is 25 g/L. In this example, the ethanol may be added in an amount that enables at least 0.5 wt % of the total amount of methyl paraben that is to be included in the anti-microbial agent to dissolve. The ability of the paraben to dissolve in the co-solvent increases its overall solubility in the aqueous vehicle (e.g., when compared to its solubility in water alone).

In an example, the co-solvent package consists of a phenol ether and an alcohol. Examples of suitable phenol ethers include 2-phenoxyethanol, or 2-phenylethanol, or combinations thereof. Examples of suitable alcohols include methanol, ethanol, glycerol, propylene glycol, diols such as 1,6-hexanediol, 1,5-pentanediol, etc., polyethylene glycol (having a weight average molecular weight ranging from 300 g/mol to 400 g/mole, and combinations thereof.

The combination of phenol ether(s) and alcohol(s), and their respective amounts, will depend upon the paraben used, the paraben's solubility in the co-solvents, and the desired amount of the paraben to be included in the agent. Additionally, the alcohol amount may be limited by its volatility.

In one example of the agent, the phenol ether is 2-phenoxyethanol or phenylethanol present in an amount ranging from at least 0.5 wt % active to about 3 wt % active based on the total weight of the agent; and the alcohol is selected from the group consisting of propylene glycol, glycerol, polyethylene glycol (e.g., 300 or 400), and a diol, and is present in an amount ranging from about 5 wt % active to about 80 wt % active, based on the total weight of the agent. In another example of the agent, the phenol ether is 2-phenoxyethanol or phenylethanol present in an amount ranging from at least 0.5 wt % active to about 3 wt % active based on the total weight of the agent; the alcohol consists of a first alcohol and a second alcohol; the first alcohol is selected from the group consisting of methanol, ethanol, and glycerol present in an amount ranging from about 5 wt % active to about 10 wt % active, based on the total weight of the agent; and the second alcohol is propylene glycol present in an amount ranging from about 5 wt % active to about 75 wt % active, based on the total weight of the agent. In one example, the first and second solvents are present at a weight ratio of 1:1, and each is present in an amount ranging from about 5 wt % active to about 10 wt % active. In still another example of the agent, the phenol ether is 2-phenoxyethanol or phenylethanol present in an amount ranging from at least 0.5 wt % active to about 3 wt % active based on the total weight of the agent; the alcohol consists of a first alcohol and a second alcohol; the first alcohol is ethanol present in an amount ranging from about 5 wt % active to about 10 wt % active, based on the total weight of the agent; and the second alcohol is propylene glycol present in an amount ranging from about 30 wt % active to about 50 wt % active, based on the total weight of the agent.

In some examples, the aqueous vehicle consists of the co-solvent package and water. In other examples, the aqueous vehicle includes or consists of the co-solvent package, water, and one or more additives. Examples of suitable additives include a surfactant, an anti-kogation agent, a chelating agent, and/or an additional anti-microbial.

In one example, the agent further includes a surfactant. Suitable surfactant(s) include non-ionic surfactants. Some example surfactants include alcohol ethoxylates, acetylenic diols, alkyl polyethylene oxides, alkyl phenyl polyethylene oxides, polyethylene oxide block copolymers, acetylenic polyethylene oxides, polyethylene oxide (di)esters, polyethylene oxide amines, dimethicone copolyols, substituted amine oxides, fluorosurfactants, and the like. Some specific examples of non-ionic surfactants include the following from Evonik Degussa: SURFYNOL® SEF (a self-emulsifiable, wetting agent based on acetylenic diol chemistry), SURFYNOL® 440 or SURFYNOL® CT-111 (non-ionic ethoxylated low-foam wetting agents), SURFYNOL® 420 (non-ionic ethoxylated wetting agent and molecular defoamer), SURFYNOL® 104E (non-ionic wetting agents and molecular defoamer), and TEGO® Wet 510 (organic surfactant). Other specific examples of non-ionic surfactants include the following from The Dow Chemical Company: TERGITOL™ TMN-6, TERGITOL™ 15-S-7, TERGITOL™ 15-S-9, TERGITOL™ 15-S-12 (secondary alcohol ethoxylates). Still other suitable non-ionic surfactants are available from Chemours, including the CAPSTONE® fluorosurfactants, such as CAPSTONE® FS-35 (a non-ionic fluorosurfactant).

Whether a single surfactant is used or a combination of surfactants is used, the total amount of surfactant(s) in the anti-microbial agent may range from about 0.01 wt % active to about 3 wt % active based on the total weight of the anti-microbial agent. In an example, the total amount of surfactant(s) in the anti-microbial agent may be about 0.08 wt % active based on the total weight of the anti-microbial agent.

The anti-microbial agent may also include an anti-kogation agent(s) when the agent is to be jetted using thermal inkjet printing. Kogation refers to the deposit of dried printing liquid (e.g., anti-microbial agent) on a heating element of a thermal inkjet printhead. Anti-kogation agent(s) is/are included to assist in preventing the buildup of kogation.

Examples of suitable anti-kogation agents include oleth-3-phosphate (commercially available as CRODAFOS™ O3A or CRODAFOS™ N-3A) or dextran 500 k. Other suitable examples of the anti-kogation agents include CRODAFOS™ HCE (phosphate-ester from Croda Int.), CRODAFOS® O10A (oleth-10-phosphate from Croda Int.), or DISPERSOGEN® LFH (polymeric dispersing agent with aromatic anchoring groups, acid form, anionic, from Clariant), etc. It is to be understood that any combination of the anti-kogation agents listed may be used.

The anti-kogation agent may be present in the anti-microbial agent in an amount ranging from about 0.1 wt % active to about 1.5 wt % active, based on the total weight of the anti-microbial agent. In an example, the anti-kogation agent is present in an amount of about 0.5 wt % active, based on the total weight of the anti-microbial agent.

Chelating agents (or sequestering agents) may be included in the anti-microbial agent to eliminate the deleterious effects of heavy metal impurities. In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof. Methylglycinediacetic acid, trisodium salt (Na3MGDA) is commercially available as TRILON® M from BASF Corp. 4,5-dihydroxy-1,3-benzenedisulfonic acid disodium salt monohydrate is commercially available as TIRON™ monohydrate. Hexamethylenediamine tetra (methylene phosphonic acid), potassium salt is commercially available as DEQUEST® 2054 from Italmatch Chemicals.

Whether a single chelating agent is used or a combination of chelating agents is used, the total amount of chelating agent(s) in the anti-microbial agent may range from greater than 0 wt % active to about 0.5 wt % active based on the total weight of the anti-microbial agent. In an example, the chelating agent is present in an amount ranging from about 0.05 wt % active to about 0.2 wt % active based on the total weight of anti-microbial agent. In another example, the chelating agent(s) is/are present in the anti-microbial agent in an amount of about 0.05 wt % active (based on the total weight of the anti-microbial agent).

In addition to imparting anti-microbial properties to the 3D object, the paraben in the anti-microbial agent may also impart anti-microbial properties to the agent itself. Thus, in some examples, an additional anti-microbial (e.g., biocide and/or fungicide) may not be included. In other examples, an additional anti-microbial may be included in the agent.

Examples of suitable additional anti-microbials include the NUOSEPT® series (Ashland Inc.), UCARCIDE™ or KORDEK™ or ROCIMA™ (The Dow Chemical Company), the PROXEL® series (Arch Chemicals), ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (The Dow Chemical Company), and combinations thereof.

In an example, the total amount of additional anti-microbial(s) in the anti-microbial agent ranges from about 0.01 wt % active to about 0.05 wt % active (based on the total weight of the anti-microbial agent). In another example, the total amount of additional anti-microbial(s) in the anti-microbial agent is about 0.04 wt % active (based on the total weight of the anti-microbial agent).

As will be described in further detail herein, the agent/anti-microbial agent may be part of a combined agent that includes an electromagnetic radiation absorbing material that is capable of absorbing electromagnetic radiation in order to generate the 3D object. Thus, some examples of the agent consist of the paraben, the aqueous vehicle, an optional surfactant, and an optional radiation absorbing material. Examples of the radiation absorbing material, and suitable amounts of the radiation absorbing material, are described herein with examples of the fusing agent.

Fusing Agent

A variety of fusing agents may be used in the method disclosed herein, each of which includes a radiation absorbing material. In some examples, the radiation absorbing material exhibits absorption at least at some of the wavelengths within a range of from 100 nm to 4000 nm. Unless stated other, the term "absorption" means that 80% or more of the applied radiation having wavelengths within the specified range is absorbed by the radiation absorbing material. Also unless stated otherwise, the term "transparency" means that 25% or less of the applied radiation having wavelengths within the specified range is absorbed by the radiation absorbing material.

Several example fusing agents will now be described.

Fusing Agent #1

One example of the fusing agent (fusing agent #1) is referred to herein as a core fusing agent, and the radiation absorbing material in the core fusing agent has absorption at least at wavelengths ranging from 400 nm to 780 nm (e.g., in the visible region). The radiation absorbing material in the core fusing agent may also absorb energy in the infrared region (e.g., 800 nm to 4000 nm). During 3D printing, the absorption of the radiation absorbing material generates heat suitable for coalescing/fusing the build material composition in contact therewith, which leads to 3D printed objects having mechanical integrity and relatively uniform mechanical properties (e.g., strength, elongation at break, etc.). This absorption, however, also results in strongly colored, e.g., dark grey or black, 3D printed objects (or 3D printed object regions).

Examples of the radiation absorbing material in the core fusing agent may be an infrared light absorbing colorant. In an example, the radiation absorbing material is a near-infrared light absorbing colorant. Any near-infrared colorants, e.g., those produced by Fabricolor, Eastman Kodak, or BASF, Yamamoto, may be used in the core fusing agent. As one example, the core fusing agent may be a printing liquid formulation including carbon black as the radiation absorbing material. Examples of this printing liquid formulation are commercially known as CM997A, 516458, C18928, C93848, C93808, or the like, all of which are available from HP Inc.

As another example, the core fusing agent may be a printing liquid formulation including near-infrared absorbing dyes as the radiation absorbing material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

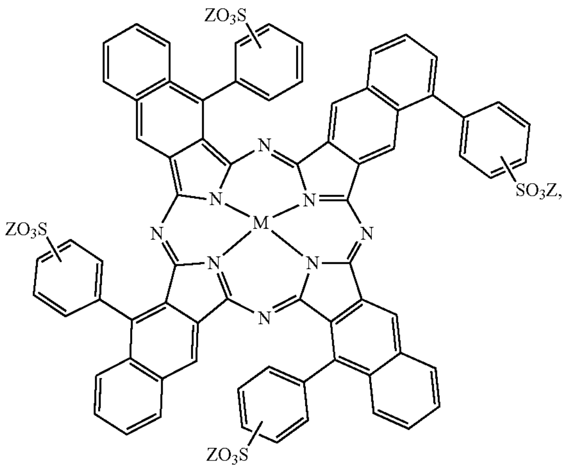

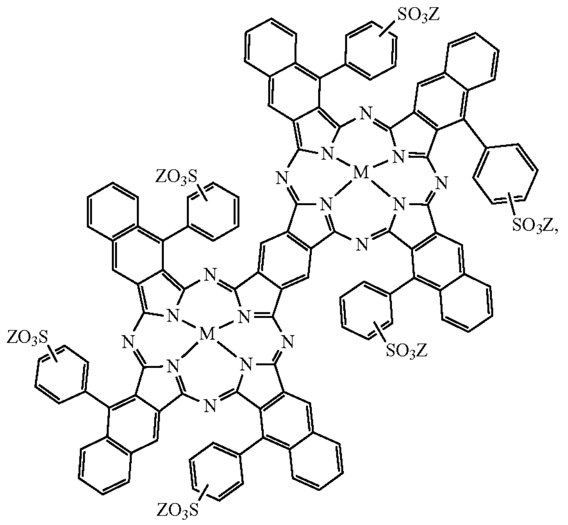

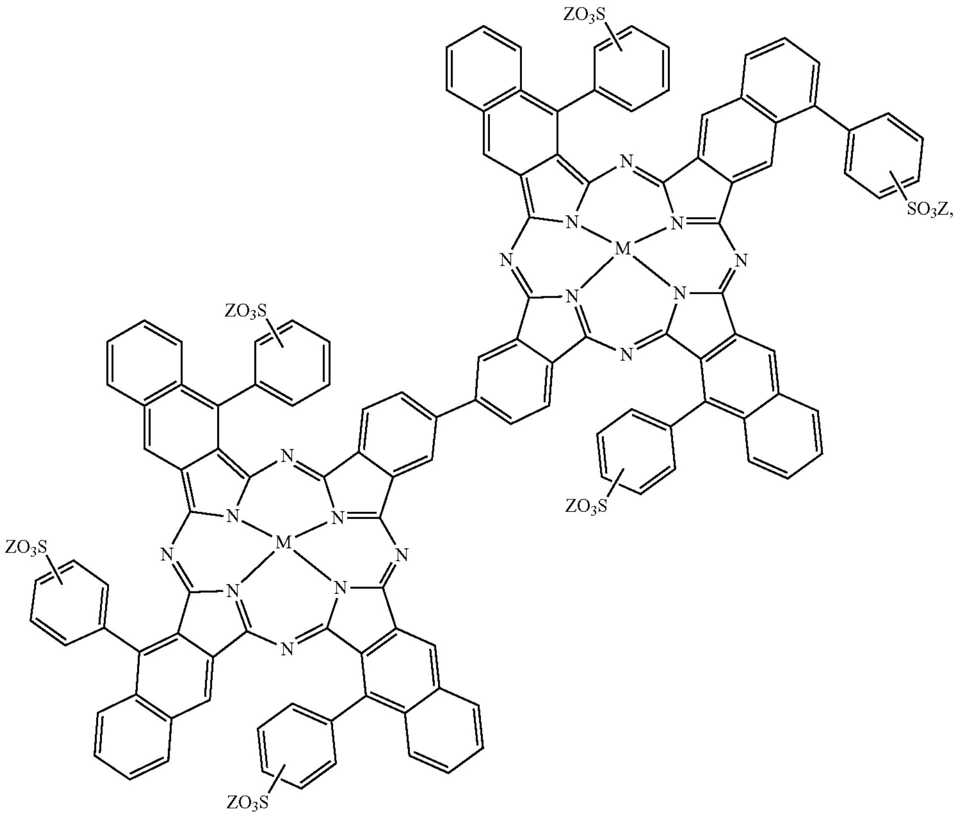

-continued

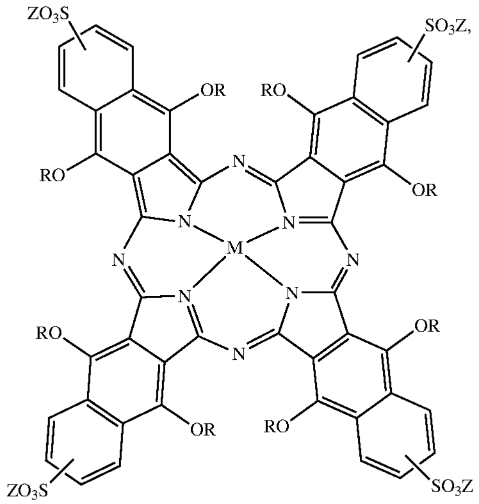

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

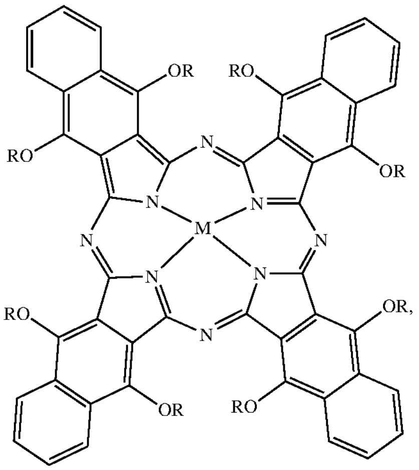

-continued

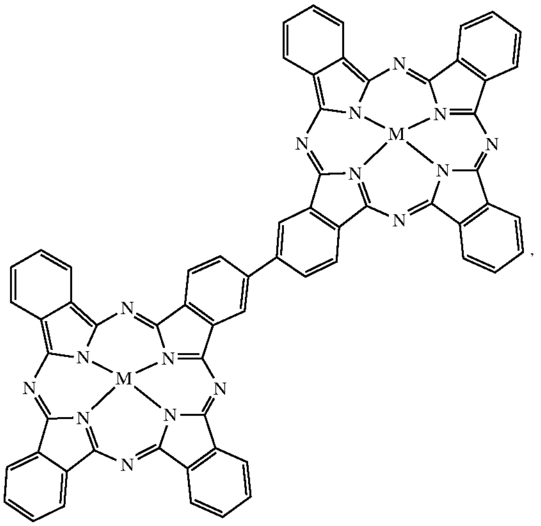

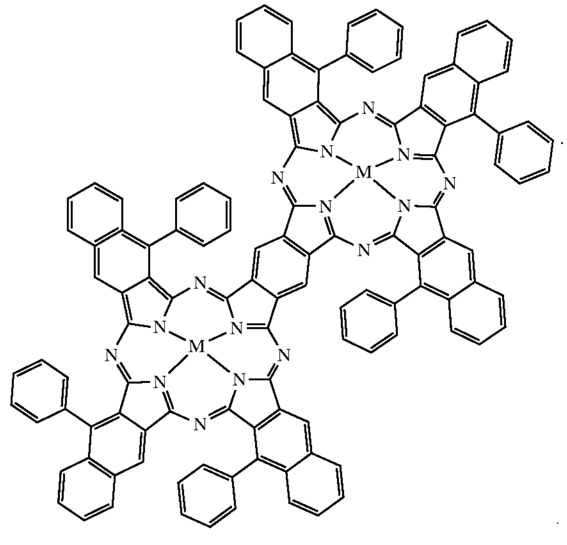

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used in the core fusing agent. Some examples include anthraquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthraquinone dyes or pigments and metal (e.g., nickel) dithiolene dyes or pigments may have the following structures, respectively:

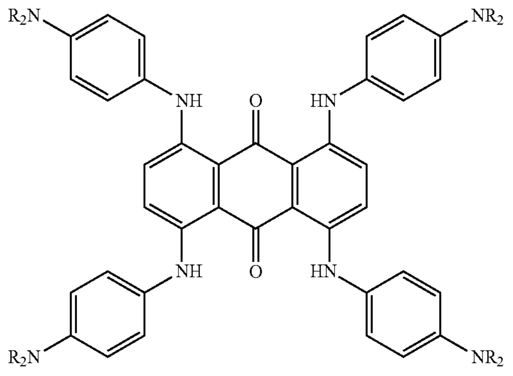

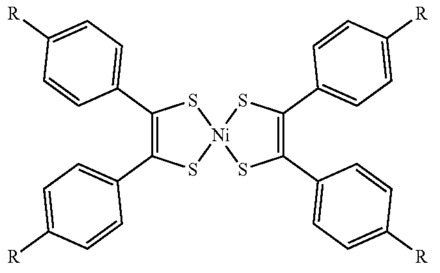

where R in the anthraquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

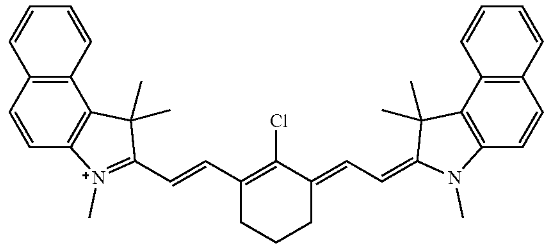

Cyanine dyes/pigments

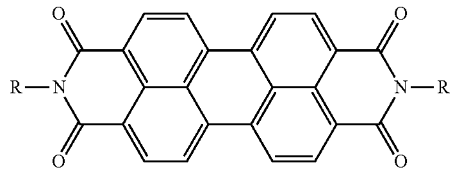

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

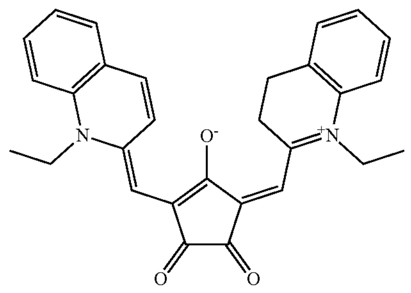

Croconium dyes/pigments

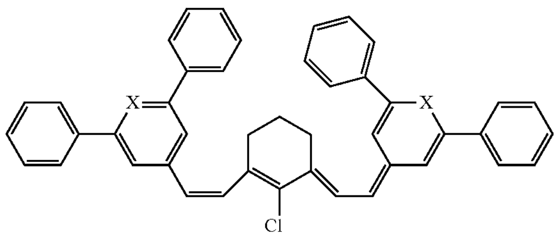

Pyrilium (X = O), thiopyrilium (X = S) dyes/pigments

Boron-dipyrromethene dyes or pigments and aza-boron-dipyrromethene dyes or pigments may have the following structures, respectively:

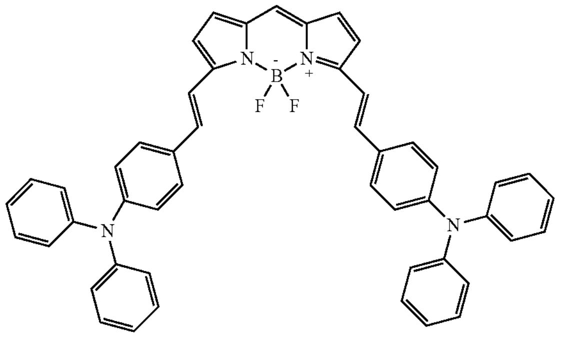

boron-dipyrromethene dyes/pigments

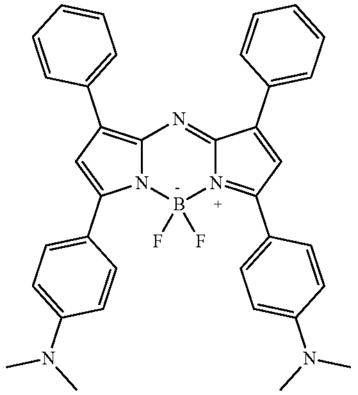

aza-boron-dipyrromethene dyes/pigments

Other suitable near-infrared absorbing dyes may include aminium dyes, tetraaryldiamine dyes, phthalocyanine dyes, and others.

Other near infrared absorbing materials include conjugated polymers (i.e., a polymer that has a backbone with alternating double and single bonds), such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof.

The amount of the radiation absorbing material that is present in the core fusing agent ranges from greater than 0 wt % active to about 40 wt % active based on the total weight of the core fusing agent. In other examples, the amount of the radiation absorbing material in the core fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these radiation absorbing material loadings provide a balance between the core fusing agent having jetting reliability and heat and/or radiation absorbance efficiency.

Fusing Agent #2

Another example of the fusing agent (fusing agent #2) is referred to herein as a primer fusing agent or a low tint fusing agent, and the radiation absorbing material in the primer fusing agent is a plasmonic resonance absorber having absorption at wavelengths ranging from 100 nm to 400 nm or 800 nm to 4000 nm and having transparency at wavelengths ranging from 400 nm to 780 nm. This absorption and transparency allow the primer fusing agent to absorb enough radiation to coalesce/fuse the build material composition in contact therewith, while enabling the 3D printed objects (or 3D printed regions) to be white or slightly colored.

Some examples of the primer fusing agent are dispersions including the radiation absorbing material that has absorption at wavelengths ranging from 800 nm to 4000 nm and transparency at wavelengths ranging from 400 nm to 780 nm. The absorption of this radiation absorbing material may be the result of plasmonic resonance effects. Electrons associated with the atoms of the radiation absorbing material may be collectively excited by radiation, which results in collective oscillation of the electrons. The wavelengths that can excite and oscillate these electrons collectively are dependent on the number of electrons present in the radiation absorbing material particles, which in turn is dependent on the size of the radiation absorbing material particles. The amount of energy that can collectively oscillate the particle's electrons is low enough that very small particles (e.g., 1 nm to 100 nm) may absorb radiation with wavelengths several times (e.g., from 8 to 800 or more times) the size of the particles. The use of these particles allows the primer fusing agent to be inkjet jettable as well as electromagnetically selective (e.g., having absorption at wavelengths ranging from 800 nm to 4000 nm and transparency at wavelengths ranging from 400 nm to 780 nm).

In an example, the radiation absorbing material of the primer fusing agent has an average particle size (e.g., average diameter) ranging from greater than 0 nm to less than 220 nm. In another example, the radiation absorbing material has an average particle size ranging from greater than 0 nm to 120 nm. In a still another example, the radiation absorbing material has an average particle size ranging from about 10 nm to about 200 nm. In some examples, the radiation absorbing material particles within a distribution of the particles can have a median diameter (D50) ranging from about 50 nm to about 150 nm. In an example, the median value may be weighted by volume.

In an example, the radiation absorbing material of the primer fusing agent is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the radiation absorbing material that is present in the primer fusing agent ranges from greater than 0 wt % active to about 40 wt % active based on the total weight of the primer fusing agent. In other examples, the amount of the radiation absorbing material in the primer fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these radiation absorbing material loadings provide a balance between the primer fusing agent having jetting reliability and heat and/or radiation absorbance efficiency.

The radiation absorbing material of the primer fusing agent may, in some instances, be dispersed with a dispersant. As such, the dispersant helps to uniformly distribute the radiation absorbing material throughout the primer fusing agent. Examples of suitable dispersants include polymer or small molecule dispersants, charged groups attached to the radiation absorbing material surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the primer fusing agent may range from about 10 wt % to about 200 wt % based on the weight of the radiation absorbing material in the primer fusing agent.

A silane coupling agent may also be added to the primer fusing agent to help bond the organic (e.g., dispersant) and inorganic (e.g., pigment) materials. Examples of suitable silane coupling agents include the SILQUEST® A series manufactured by Momentive.

Whether a single silane coupling agent is used or a combination of silane coupling agents is used, the total amount of silane coupling agent(s) in the primer fusing agent may range from about 0.1 wt % active to about 50 wt % active based on the weight of the radiation absorbing material in the primer fusing agent. In an example, the total amount of silane coupling agent(s) in the primer fusing agent ranges from about 1 wt % active to about 30 wt % active based on the weight of the radiation absorbing material. In another example, the total amount of silane coupling agent(s) in the primer fusing agent ranges from about 2.5 wt % active to about 25 wt % active based on the weight of the radiation absorbing material.

One example of the primer fusing agent includes cesium tungsten oxide (CTO) nanoparticles as the radiation absorbing material. The CTO nanoparticles have a formula of $Cs_xWO_3$, where $0<x<1$. The cesium tungsten oxide nanoparticles may give the primer fusing agent a light blue color. The strength of the color may depend, at least in part, on the amount of the CTO nanoparticles in the primer fusing agent. When it is desirable to form an outer white layer on the 3D printed object, less of the CTO nanoparticles may be used in the primer fusing agent in order to achieve the white color. In an example, the CTO nanoparticles may be present in the primer fusing agent in an amount ranging from about 1 wt % active to about 20 wt % active (based on the total weight of the primer fusing agent).

The average particle size of the CTO nanoparticles may range from about 1 nm to about 40 nm. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the primer fusing agent may also include a zwitterionic stabilizer. The zwitterionic stabilizer may improve the stabilization of this example of the primer fusing agent. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the primer fusing agent.

Examples of suitable zwitterionic stabilizers include $C_2$ to $C_8$ betaines, $C_2$ to $C_8$ aminocarboxylic acids having a solubility of at least 10 g in 100 g of water, taurine, and combinations thereof. Examples of the $C_2$ to $C_8$ aminocarboxylic acids include beta-alanine, gamma-aminobutyric acid, glycine, and combinations thereof.

The zwitterionic stabilizer may be present in the primer fusing agent in an amount ranging from about 2 wt % active to about 35 wt % active (based on the total weight of the primer fusing agent). When the zwitterionic stabilizer is the $C_2$ to $C_8$ betaine, the $C_2$ to $C_8$ betaine may be present in an amount ranging from about 8 wt % to about 35 wt % active of the total weight of the primer fusing agent. When the zwitterionic stabilizer is the $C_2$ to $C_8$ aminocarboxylic acid, the $C_2$ to C aminocarboxylic acid may be present in an amount ranging from about 2 wt % active to about 20 wt % active of the total weight of the primer fusing agent. When the zwitterionic stabilizer is taurine, taurine may be present in an amount ranging from about 2 wt % active to about 35 wt % active of the total weight of the primer fusing agent.

In this example, the weight ratio of the CTO nanoparticles to the zwitterionic stabilizer may range from 1:10 to 10:1; or the weight ratio of the CTO nanoparticles to the zwitterionic stabilizer may be 1:1.

Fusing Agent #3

Still another example of the fusing agent (fusing agent #3) is referred to herein as an ultraviolet (UV) light fusing agent, and the radiation absorbing material in the UV fusing agent is a molecule or compound having absorption at wavelengths ranging from 100 nm to 400 nm. These radiation absorbing materials efficiently absorb the UV radiation, convert the absorbed UV radiation to thermal energy, and promote the transfer of the thermal heat to build material composition in order to coalesce the build material composition.

The UV fusing agent can be used with a narrow-band emission source, such as UV light emitting diodes (LEDs), which reduces the band of photon energies to which the non-patterned build material is exposed and thus potentially absorbs. This can lead to more accurate object shapes and reduced rough edges. Some UV radiation absorbing materials are substantially colorless and thus can generate much lighter (e.g., white, off-white, or even translucent) 3D objects than infrared (IR) and/or visible radiation absorbing materials.

Some examples of UV radiation absorbing materials suitable for the UV fusing agent include a B vitamin and/or a B vitamin derivative. Any B vitamins and/or B vitamin derivatives that are water soluble and that have absorption at wavelengths ranging from about 340 nm to about 415 nm may be used in the UV light fusing agent. As used herein, the phrase "that has absorption at wavelengths ranging from about 340 nm to about 415 nm" means that the B vitamin or B vitamin derivative exhibits maximum absorption at a wavelength within the given range and/or has an absorbance of about 0.1 (about 80% transmittance or less) at one or more wavelengths within the given range. Some of the B vitamins or B vitamin derivatives have lower absorbance. These B vitamins or B vitamin derivatives can still result in suitable coalescence and fusing when they are coupled with a higher intensity and/or a higher dose (where dose=intensity*radiation time).

Examples of suitable B vitamins include riboflavin (vitamin B2), pantothenic acid (vitamin B5), pyridoxine (one form of vitamin B6), pyridoxamine (another form of vitamin B6), biotin (vitamin B7), folic acid (synthetic form of vitamin B9), cyanocobalamin (synthetic form of vitamin B12), and combinations thereof. Examples of suitable B vitamin derivatives include flavin mononucleotide, pyridoxal phosphate hydrate, pyridoxal hydrochloride, pyridoxine hydrochloride, and combinations thereof. Any combination of one or more B vitamins and one or more B vitamin derivatives may also be used. This may be desirable, for example, when one vitamin or vitamin derivative is less absorbing.

The amount of the B vitamin and/or B vitamin derivative present in the UV light fusing agent will depend, in part, upon its solubility in water and its effect on the jettability of the fusing agent. When the solubility limit of the B vitamin and/or B vitamin derivative is low, the B vitamin and/or B vitamin derivative may be present in an amount ranging from about 1 wt % active to about 5 wt % active of the total weight of the UV light fusing agent. For example, when the B vitamin or the B vitamin derivative is selected from the group consisting of riboflavin (solubility in water 1000 mg/3,000-15,000 mL depending on the crystal structure), folic acid (solubility in water 0.01 mg/mL), cyanocobalamin (solubility in water 1000 mg/80 mL), panthotenic acid (solubility in water 2110 mg/mL), biotin (solubility in water 0.22 mg/mL), pyridoxine (solubility in water ranging from 79 mg/mL to 220 mg/mL), and combinations thereof, the B vitamin or the B vitamin derivative is present in an amount ranging from about 1 wt % active to about 5 wt % active based on a total weight of the UV light fusing agent. When the solubility limit of the B vitamin and/or B vitamin derivative is higher, the B vitamin and/or B vitamin derivative may be present in an amount ranging from about 1 wt % active to about 8 wt % active of the total weight of the fusing agent. For example, when the B vitamin or the B vitamin derivative is selected from the group consisting pyridoxal phosphate hydrate (solubility in water 5.7 mg/mL), pyridoxal hydrochloride (solubility in water 11.7 mg/mL), pyridoxine hydrochloride (solubility in water 200 mg/mL), pyridoxamine (solubility in water 29 mg/mL), and combinations thereof, the B vitamin or the B vitamin derivative may be present in an amount ranging from about 1 wt % active to about 8 wt % active based on a total weight of the UV light fusing agent.

Another example of a suitable UV radiation absorbing material is a functionalized benzophenone. Some of the functionalized benzophenones have absorption at wavelengths ranging from about 340 nm to 405 nm. The phrase "have absorption at wavelengths ranging from about 340 nm to about 405 nm" means that the functionalized benzophenone exhibits maximum absorption at a wavelength within the given range and/or has an absorbance of about 0.1 (about 80% transmittance or less) at one or more wavelengths within the given range.

The functionalized benzophenone is benzophenone substituted with at least one hydrophilic functional group. The functionalization may render the substituted benzophenone more hydrophilic than benzophenone and/or may shift the absorption of the substituted benzophenone to the desired UV range (340 nm to 405 nm). As such, the functionalized benzophenone is a benzophenone derivative including at least one hydrophilic functional group. In some examples, the functionalized benzophenone is benzophenone substituted with one hydrophilic functional group. In other examples, the functionalized benzophenone is benzophenone substituted with two hydrophilic functional groups. In still other examples, the functionalized benzophenone is benzophenone substituted with three hydrophilic functional groups. In the examples where the benzophenone is substituted with multiple functional groups, these groups may be the same or different. Examples of the hydrophilic functional group may be selected from the group consisting of an amine group, a hydroxy group, an alkoxy group, a carboxylic acid group, or a sulfonic acid group.

In examples where the at least one hydrophilic functional group is the amine group, the functionalized benzophenone is selected from the group consisting of 4-aminobenzophenone:

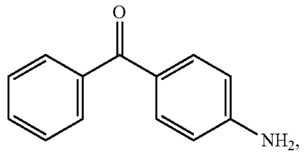 [SMILES: Nc1ccc(C(=O)c2ccccc2)cc1]

4-dimethylaminobenzophenone:

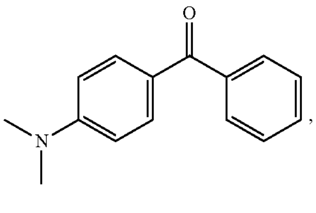 [SMILES: CN(C)c1ccc(C(=O)c2ccccc2)cc1 ; ","]

and combinations thereof.

In examples where the at least one hydrophilic functional group is the hydroxy group, the functionalized benzophenone is selected from the group consisting are 4-hydroxybenzophenone:

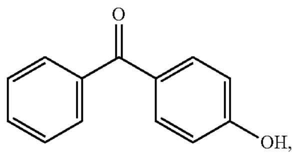 [SMILES: O=C(c1ccccc1)c1ccc(O)cc1]

2,4-dihydroxy-benzophenone:

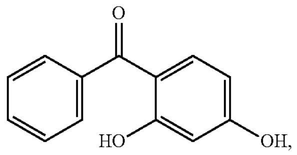 [SMILES: O=C(c1ccccc1)c1ccc(O)cc1O]

4,4-dihydroxy-benzophenone:

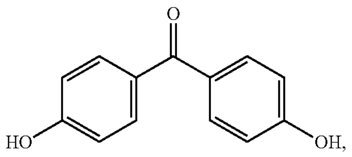 [SMILES: O=C(c1ccc(O)cc1)c1ccc(O)cc1]

2,4,4'-trihydroxy-benzophenone:

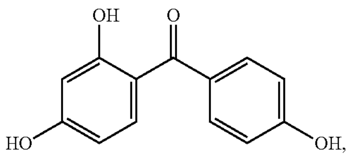 [SMILES: O=C(c1ccc(O)cc1)c1ccc(O)cc1O]

2,4,6-trihydroxy-benzophenone:

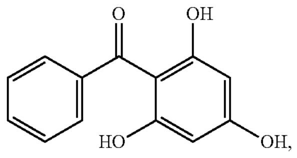 [SMILES: O=C(c1ccccc1)c1c(O)cc(O)cc1O]

2,2',4,4'-tetrahydroxy-benzophenone:

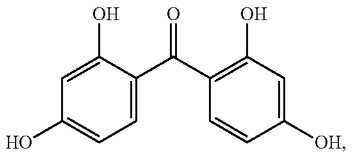 [SMILES: O=C(c1ccc(O)cc1O)c1ccc(O)cc1O]

2,3,4-trihydroxy-benzophenone:

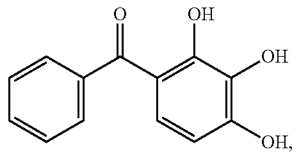 [SMILES: O=C(c1ccccc1)c1ccc(O)c(O)c1O]

2,3,4,4'-tetrahydroxy-benzophenone:

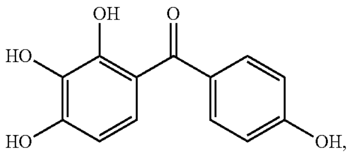 [SMILES: O=C(c1ccc(O)cc1)c1ccc(O)c(O)c1O]

and combinations thereof.

In examples where the at least one hydrophilic functional group is the alkoxy group, the functionalized benzophenone is 4,4'-dimethoxybenophenone:

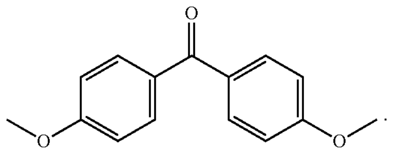

In other examples, the functionalized benzophenone may contain hydrophilic functional groups that are different. In these examples, the functionalized benzophenone is a benzophenone derivative including at least two different hydrophilic functional groups.

In one example, a first hydrophilic functional group of the at least two different hydrophilic functional groups is an alkoxy group, and a second hydrophilic functional group of the at least two different hydrophilic functional groups is a hydroxyl group. Some examples of these functionalized benzophenones include 2-hydroxy-4-dodecyloxy-benzophenone:

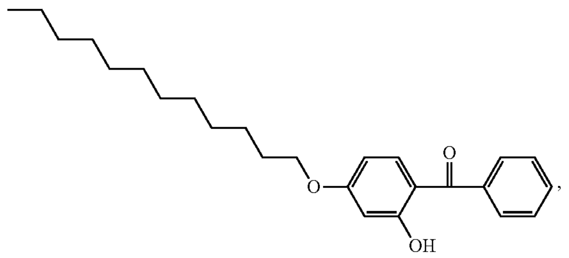 [SMILES: CCCCCCCCCCCCOc1ccc(C(=O)c2ccccc2)c(O)c1 ; ","]

2-hydroxy-4-methoxy-benzophenone:

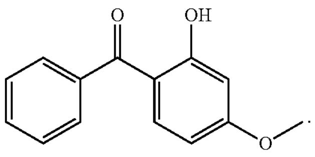 [SMILES: COc1ccc(C(=O)c2ccccc2)c(O)c1 ; "."]

2,2'-hydroxy-4-methoxy-benzophenone:

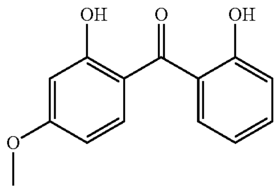
, and combinations thereof.

In another example, a first hydrophilic functional group of the at least two different hydrophilic functional groups may be selected from the group consisting of a hydroxy group and a carboxylic acid group, and a second hydrophilic functional group of the at least two different hydrophilic functional groups is an alkyl group. Some examples of these functionalized benzophenones include 2-hydroxy-4-methyl-benzophenone;

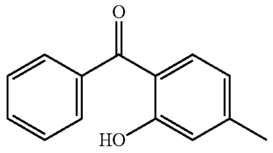 [SMILES: Cc1ccc(C(=O)c2ccccc2)c(O)c1]

and 4'-Methylbenzo-phenone-2-carboxylic acid:

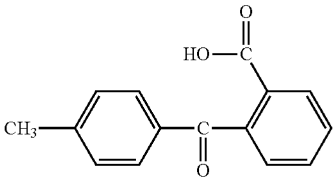
.

In yet another example, a first hydrophilic functional group of the at least two different hydrophilic functional groups is a hydroxy group, a second hydrophilic functional group of the at least two different hydrophilic functional groups is an alkoxy group, and a third hydrophilic functional group of the at least two different hydrophilic functional groups is a sulfonic acid group. An example of this functionalized benzophenone is 2-hydroxy-4-methoxy-benzophenone-5-sulfonic acid.

Examples of the functionalized benzophenones include 4-hydroxy-benzophenone, 2,4-dihydroxy-benzophenone, 4,4 dihydroxy-benzophenone, 2,4,4'-trihydroxy-benzophenone, 2,4,6 trihydroxy-benzophenone, 2,2',4,4'-tetrahydroxy-benzophenone, 4,4'-dimethoxybenzophenone, 4-aminobenzophenone, 4-dimethylamino-benzophenone, 2-hydroxy-4-methyl-benzophenone, 4'-methylbenzo-phenone-2-carboxylic acid, 2-hydroxy-4-dodecyloxy-benzophenone, 2-hydroxy-4-methoxy-benzophenone, 2-hydroxy-4-methoxy-benzophenone-5-sulfonic acid, 2,3,4-trihydroxy-benzophenone, 2,3,4,4'-tetrahydroxy-benzophenone, 2,2'-hydroxy-4-methoxy-benzophenone, and combinations thereof.

While several examples of functionalized benzophenones have been provided herein, it is to be understood that any benzophenone substituted with at least one hydrophilic functional group may be used. These may be naturally occurring or synthesized. As examples, benzophenone derivatives with at least one poly(ethylene glycol) (PEG) chain or with at least one phosphocholine chain may be synthesized.

The functionalized benzophenone is at least partially soluble in an aqueous vehicle of the UV light fusing agent. The phrase "at least partially soluble" means that at least 0.5 wt % of the functionalized benzophenone is able to dissolve in the aqueous vehicle.

The amount of the functionalized benzophenone present in the UV light fusing agent will depend, in part, upon its solubility in the aqueous vehicle and its effect on the jettability of the fusing agent. The functionalized benzophenone may be present in an amount ranging from about 0.01 wt % active to about 10 wt % active of the total weight of the fusing agent. When the solubility limit of the functionalized benzophenone in the aqueous vehicle is low (e.g., is less than 5 wt % soluble), the functionalized benzophenone may be present in an amount ranging from about 0.01 wt % active to about 5 wt % active of the total weight of the fusing agent. In an example, the functionalized benzophenone may be present in an amount ranging from about 2 wt % active to about 4 wt % active of the total weight of the fusing agent.

Still another example of UV radiation absorbing material is a plasmonic metal nanoparticle that i) provides absorption enhancement at radiation wavelengths ranging from about 340 nm to about 450 nm, and ii) is present in an amount up to 2 wt % active based on a total weight of the UV light fusing agent.

In an example, the plasmonic metal nanoparticle is selected from the group consisting of silver nanoparticles, gold nanoparticles, copper nanoparticles, aluminum nanoparticles, and combinations thereof. The example plasmonic metal nanoparticles do not merely absorb the UV in the selected range, they exhibit enhanced absorption caused by localized surface plasmon resonance in the near UV and the high photon energy end of visible range (range 340-450 nm). The phrase "absorbs radiation at wavelengths ranging from about 340 nm to about 450 nm" means that the plasmonic metal nanoparticle exhibits maximum absorption at a wavelength within the given range and/or has an absorbance greater than 1 (about 10% transmittance or less) at one or more wavelengths within the given range.

The plasmonic metal nanoparticle may have an average particle size ranging from about 1 nm to about 200 nm. In one example, the plasmonic metal nanoparticle has an average particle size ranging from about 1 nm to about 100 nm. In another example, the plasmonic metal nanoparticle has an average particle size ranging from about 1 nm to about 50 nm. In some examples, the plasmonic metal nanoparticle within a distribution of the particles can have a median diameter (D50) ranging from about 50 nm to about 150 nm. In an example, the median value may be weighted by volume.

Yet another example of a suitable UV radiation absorbing material is a fluorescent yellow dye having a targeted wavelength of maximum absorption for a 3D print system including the narrow UV-band emission source. The UV light absorber consists of the fluorescent yellow dye, without any other colorant. In particular, it would not be desirable to include any pigment or dye that absorbs other light, or any pigment that could crash out of solution when included with the fluorescent yellow dye.

The fluorescent yellow dye may be pyranine:

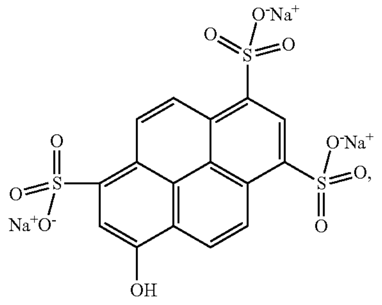

a pyranine derivative, coumarin:

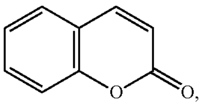 [SMILES: O=c1ccc2ccccc2o1]

a coumarin derivative, a naphthalimide:

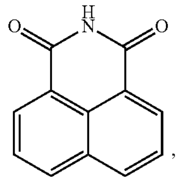 [SMILES: O=C1NC(=O)c2cccc3cccc1c23 ; ","]

a naphthalimide derivative, a disazomethine derivative: RCH═N—N═CHR, or mixture of these compounds. Some specific examples include Solvent Green 7 (pyranine), Acid Yellow 184 (a coumarin derivative), Acid Yellow 250 (a coumarin derivative), Yellow 101 (Aldazine:

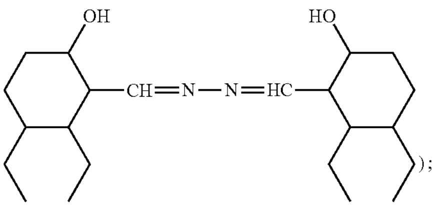 [SMILES: CCC1CCC(O)C(C=NN=CC2C(O)CCC(CC)C2CC)C1CC ; ";"]

Basic Yellow 40 (a coumarin derivative), Solvent Yellow 43 (a naphthalimide derivative), Solvent Yellow 44 (a naphthalimide derivative), Solvent Yellow 85 (a naphthalimide derivative), Solvent Yellow 145 (a coumarin derivative), Solvent Yellow 160:1 (a coumarin derivative), and combinations thereof.

The fluorescent yellow dye may be present in the UV light fusing agent in an amount ranging from about 1 wt % active to about 10 wt % active, based on a total weight of the UV light fusing agent. In another example, the fluorescent yellow dye may be present in the fusing agent in an amount ranging from about 5 wt % active to about 8 wt % active, or from about 5.5 wt % active to about 7.5 wt % active.

Fusing Agent Vehicle

Any example of the fusing agent (core fusing agent, primer fusing agent, UV light fusing agent) includes a liquid vehicle. The fusing agent vehicle, or "FA vehicle," may refer to the liquid in which the radiation absorbing material(s) is/are dispersed or dissolved to form the respective fusing agent. A wide variety of FA vehicles, including aqueous and non-aqueous vehicles, may be used in the fusing agents. In some examples, the FA vehicle may include water alone or a non-aqueous solvent alone, i.e., with no other components. In other examples, the FA vehicle may include other components, depending, in part, upon the applicator that is to be used to dispense the fusing agent. Examples of other suitable fusing agent components include co-solvent(s), humectant (s), surfactant(s), anti-microbial(s), anti-kogation agent(s), chelating agent(s), buffer(s), pH adjuster(s), preservative(s), and/or combinations thereof.

Classes of water soluble or water miscible organic co-solvents that may be used in the fusing agents include aliphatic alcohols, aromatic alcohols, diols, glycol ethers, polyglycol ethers, lactams, formamides (substituted and unsubstituted), acetamides (substituted and unsubstituted), glycols, and long chain alcohols. Examples of these co-solvents include primary aliphatic alcohols, secondary aliphatic alcohols, 1,2-alcohols (e.g., 1,2-ethanediol, 1,2-propanediol, etc.), 1,3-alcohols (e.g., 1,3-propanediol), 1,5-alcohols (e.g., 1,5-pentanediol), 1,6-hexanediol or other diols (e.g., 2-methyl-1,3-propanediol, etc.), ethylene glycol alkyl ethers, propylene glycol, propylene glycol alkyl ethers, higher homologs ($C_6$-$C_{12}$) of polyethylene glycol alkyl ethers, diethylene glycol, triethylene glycol, tripropylene glycol methyl ether, tetraethylene glycol, glycerol, N-alkyl caprolactams, unsubstituted caprolactams, 2-pyrrolidone, 1-methyl-2-pyrrolidone, 1-(2-hydroxyethyl)-2-pyrrolidone, and the like. Other examples of organic co-solvents include dimethyl sulfoxide (DMSO), isopropyl alcohol, ethanol, pentanol, acetone, or the like.

The co-solvent(s) may be present in the fusing agent in a total amount ranging from about 1 wt % active to about 20 wt % active based upon the total weight of the fusing agent. In an example, the fusing agent includes from about 2 wt % active to about 15 wt % active, or from about 5 wt % active to about 10 wt % active of the co-solvent(s).

The FA vehicle may also include humectant(s). An example of a suitable humectant is ethoxylated glycerin having the following formula:

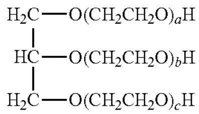

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In an example, the total amount of the humectant(s) present in the fusing agent ranges from about 3 wt % active to about 10 wt % active, based on the total weight of the fusing agent.

The FA vehicle may also include surfactant(s). Suitable surfactant(s) include non-ionic or anionic surfactants. Some example surfactants include alcohol ethoxylates, alcohol ethoxysulfates, acetylenic diols, alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, fluorosurfactants, and the like. Any example of the non-ionic surfactants set forth herein for the anti-microbial agent may be used in the FA vehicle. Some specific examples of anionic surfactants include alkyldiphenyloxide disulfonate (e.g., the DOWFAX™ series, such a 2A1, 3B2, 8390, C6L, C10L, and 30599, from The Dow Chemical Company), docusate sodium (i.e., dioctyl sodium sulfosuccinate), sodium dodecyl sulfate (SDS).

Whether a single surfactant is used or a combination of surfactants is used, the total amount of surfactant(s) in the fusing agent may range from about 0.01 wt % active to about 3 wt % active based on the total weight of the fusing agent. In an example, the total amount of surfactant(s) in the fusing agent may be about 1 wt % active based on the total weight of the build material reactive functional agent.

The FA vehicle may also include anti-microbial(s) (i.e., biocide and/or fungicide). Any example of the additional anti-microbial set forth herein for the anti-microbial agent may be used in the FA vehicle.

In an example, the total amount of anti-microbial(s) in the fusing agent ranges from about 0.01 wt % active to about 0.05 wt % active (based on the total weight of the fusing agent). In another example, the total amount of anti-microbial(s) in the fusing agent is about 0.04 wt % active (based on the total weight of the fusing agent).

The FA vehicle may also include anti-kogation agent(s). Any example of the anti-kogation agent set forth herein for the anti-microbial agent may be used in the FA vehicle.

The anti-kogation agent may be present in the fusing agent in an amount ranging from about 0.1 wt % active to about 1.5 wt % active, based on the total weight of the fusing agent. In an example, the anti-kogation agent is present in an amount of about 0.5 wt % active, based on the total weight of the fusing agent.

Chelating agents (or sequestering agents) may be included in the FA vehicle to eliminate the deleterious effects of heavy metal impurities. Any of the chelating agents described herein for the anti-microbial agent may be used, and in an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof.

Whether a single chelating agent is used or a combination of chelating agents is used, the total amount of chelating agent(s) in the fusing agent may range from greater than 0 wt % active to about 0.5 wt % active based on the total weight of the fusing agent. In an example, the chelating agent is present in an amount ranging from about 0.05 wt % active to about 0.2 wt % active based on the total weight of fusing agent. In another example, the chelating agent(s) is/are present in the fusing agent in an amount of about 0.05 wt % active (based on the total weight of the fusing agent).

Some examples of the fusing agent include a buffer. The buffer may be TRIS (tris(hydroxymethyl)aminomethane or TRIZMA®), TRIS or TRIZMA® hydrochloride, bis-tris propane, TES (2-[(2-Hydroxy-1,1-bis(hydroxymethyl) ethyl)amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO (β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl) piperazine-N'-(4-butanesulfonic acid)), TAPS ([tris (hydroxymethyl)methylamino]propanesulfonic acid), AMPD (2-amino-2-methyl-1,3-propanediol), TABS (N-tris (Hydroxymethyl)methyl-4-aminobutanesulfonic acid), or the like.

In an example, the total amount of buffer(s) in the fusing agent ranges from about 0.01 wt % active to about 3 wt % active (based on the total weight of the fusing agent).

Some examples of the fusing agent include a pH adjuster. Suitable pH adjusters may include amino acids or sodium bicarbonate. An example of a suitable amino acid pH adjuster is taurine. In an example, the total amount of the pH adjuster(s) in the fusing agent ranges from about 0.01 wt % active to about 3 wt % active (based on the total weight of the fusing agent).

Some examples of the fusing agent include a preservative. Preservatives may be particular suitable when vitamin B or a vitamin B derivative is used as the radiation absorbing material. Examples of suitable preservatives include 2-phenoxyethanol, sodium benzoate, and parabens. In an example, the total amount of the preservative(s) in the fusing agent ranges from about 0.1 wt % active to about 3 wt % active (based on the total weight of the fusing agent).

Some examples of the fusing agent, particularly the UV light fusing agent, also include a base. In some examples, the B vitamin or the B vitamin derivative is more soluble at a neutral or basic pH. For example, folic acid is more soluble in an aqueous vehicle having a pH greater than 5. As such, it may be desirable to add a base, such as potassium hydroxide, sodium hydroxide, or tetramethylammonium hydroxide, until the desired pH is obtained. In an example, the total amount of the base in the fusing agent ranges from about 0.5 wt % active to about 5 wt % active (based on the total weight of the fusing agent). In other examples, the amount of base may range from about 0.75 wt % active to about 2.5 wt % active.

The balance of the fusing agent is water (e.g., deionized water, purified water, etc.) or one of the co-solvents. With aqueous vehicles, the amount of water may vary depending upon the amounts of the other components in the fusing agent. In one example, the fusing agent is jettable via a thermal inkjet printhead, and includes from about 50 wt % to about 90 wt % water.

Combined Fusing and Anti-Microbial Agent

The examples disclosed herein describe an anti-microbial agent and a separate fusing agent. Separate agents allow for the patterning of the 3D object (with the fusing agent) and the patterning of anti-microbial areas of the 3D object to be separately controlled. However, it is to be understood that the paraben (of the anti-microbial agent) and the radiation absorbing material (of the fusing agent) may be combined into a single anti-microbial/fusing agent. The combined anti-microbial/fusing agent may include the paraben, the co-solvent package of the anti-microbial agent, the radiation absorbing material of any example of the fusing agent described herein, water, and, if desirable, any example of the other FA vehicle components described herein. In one example, any example of the anti-microbial agent disclosed herein may further include any example of the radiation absorbing material disclosed herein. In one example, the radiation absorbing material is selected from the group consisting of an infrared radiation absorbing material and an ultraviolet radiation absorbing material.

This combined anti-microbial/fusing agent may be useful, for example, when it is desirable to provide anti-microbial properties throughout the 3D object. This combined anti-microbial/fusing agent may also be used with a separate fusing agent. In this example, the separate fusing agent may be used to pattern portion(s) of the 3D object that are not to exhibit anti-microbial properties, and the combined anti-microbial/fusing agent may be used to pattern portion(s) of the 3D object that are to exhibit anti-microbial properties.

Detailing Agent

The methods disclosed herein involve the selective application of the fusing agent to pattern the layer of the build material composition that will become part of the 3D object. The methods may also involve the selective application of a detailing agent. The detailing agent does not include a radiation absorbing material, and thus may be applied to portion(s) of the build material composition that are outside of the digital 3D object model that defines the 3D object being printed. The portion(s) of the build material composition exposed to the detailing agent may experience a cooling effect, and thus the detailing agent helps to keep the portion(s) from coalescing.

The detailing agent may include a surfactant, a co-solvent, and a balance of water. In some examples, the detailing agent consists of these components, and no other components. In some other examples, the detailing agent may further include a colorant. In still some other examples, the detailing agent consists of a colorant, a surfactant, a co-solvent, and a balance of water, with no other components. In yet some other examples, the detailing agent may further include additional components, such as anti-kogation agent(s), anti-microbial(s), and/or chelating agent(s) (each of which is described above in reference to the anti-microbial agent and/or the fusing agent).

The surfactant(s) that may be used in the detailing agent include any of the surfactants listed herein in reference to the fusing agent. The total amount of surfactant(s) in the detailing agent may range from about 0.10 wt % active to about 5.00 wt % active with respect to the total weight of the detailing agent.

The co-solvent(s) that may be used in the detailing agent include any of the co-solvents listed above in reference to the fusing agent. The total amount of co-solvent(s) in the detailing agent may range from about 1 wt % active to about 65 wt % active with respect to the total weight of the detailing agent.

In some examples, the detailing agent does not include a colorant. In these examples, the detailing agent may be colorless. As used herein, "colorless," means that the detailing agent is achromatic and does not include a colorant. The colorless detailing agent may be used with any of the fusing agents disclosed herein.

In other examples, the detailing agent does include a colorant. It may be desirable to add color to the detailing agent when the detailing agent is applied to the edge of a colored 3D object, such as an object formed using the core fusing agent. Color in the detailing agent may be desirable when used at a part edge because some of the colorant may become embedded in the build material composition that fuses/coalesces at the edge. As such, in some examples, the dye in the detailing agent may be selected so that its color matches the color of the radiation absorbing material in the fusing agent. As examples, the dye may be any azo dye having sodium or potassium counter ion(s) or any diazo (i.e., double azo) dye having sodium or potassium counter ion(s), where the color of azo or dye azo dye matches the color of the fusing agent.

When the detailing agent includes the colorant and is to be used with the core fusing agent, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye may also be capable of absorbing radiation with wavelengths of 650 nm or less. As such, the dye absorbs at least some wavelengths within the visible spectrum, but absorbs little or no wavelengths within the near-infrared spectrum. This is in contrast to the energy absorber in the core fusing agent, which absorbs wavelengths within the near-infrared spectrum. As such, the colorant in the detailing agent will not substantially absorb the fusing radiation, and thus will not initiate melting and fusing (coalescence) of the build material composition in contact therewith when the build material layer is exposed to the energy.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl] hydrazono]naphthalene-1,7-disulfonate with a chemical structure of:

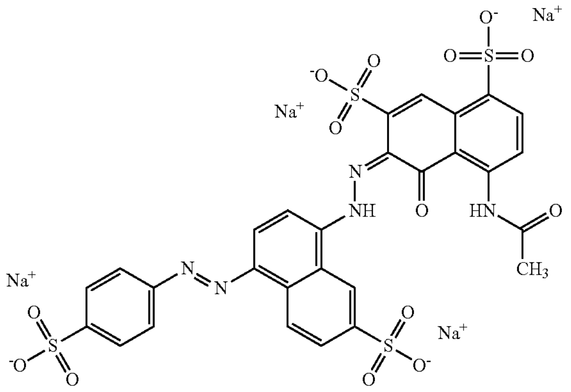

(commercially available as Food Black 1); tetrasodium 6-amino-4-hydroxy-3-[[7-sulfonato-4-[(4-sulfonatophenyl) azo]-1-naphthyl]azo]naphthalene-2,7-disulfonate with a chemical structure of:

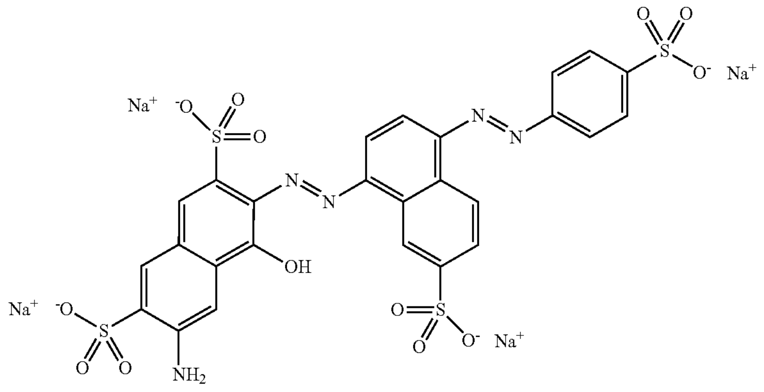

(commercially available as Food Black 2); tetrasodium (6E)-4-amino-5-oxo-3-[[4-(2-sulfonatooxyethylsulfonyl) phenyl]diazenyl]-6-[[4-(2-sulfonatooxyethylsulfonyl)phenyl]hydrazinylidene]naphthalene-2,7-disulfonate with a chemical structure of:

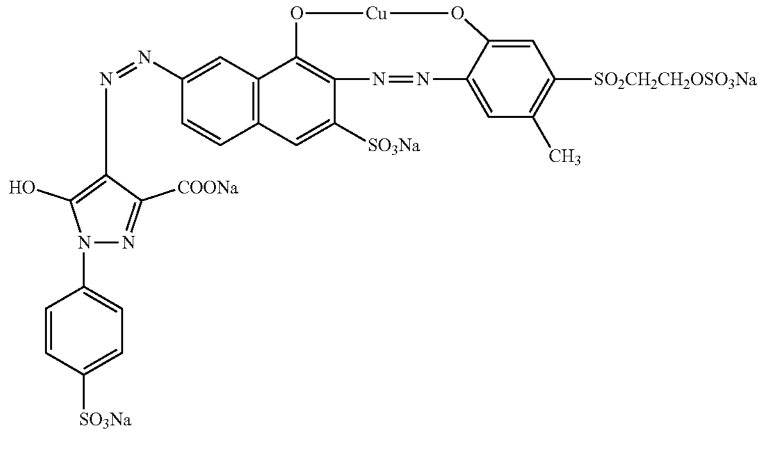

(commercially available as Reactive Black 31); tetrasodium (6E)-4-amino-5-oxo-3-[[4-(2-sulfonatooxyethylsulfonyl) phenyl]diazenyl]-6-[[4-(2-sulfonatooxyethylsulfonyl)phenyl]hydrazinylidene]naphthalene-2,7-disulfonate with a chemical structure of:

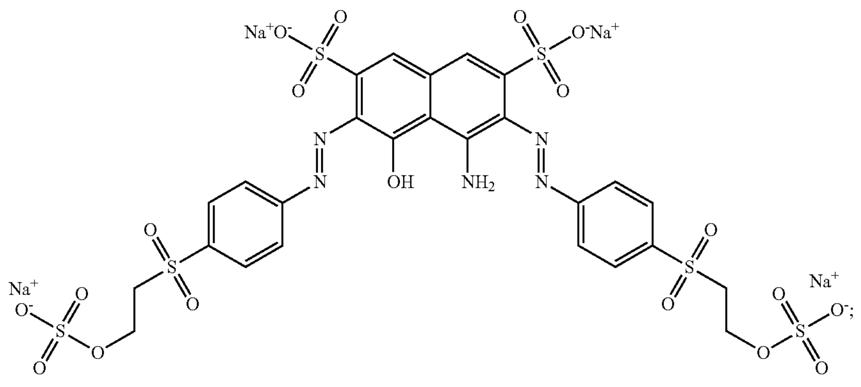

and combinations thereof. Some other commercially available examples of the dye used in the detailing agent include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D printed object.

Some examples of the other dye include a salt, such as a sodium salt, an ammonium salt, or a potassium salt. Some specific examples include ethyl-[4-[[4-[ethyl-[(3-sulfophenyl) methyl]amino]phenyl]-(2-sulfophenyl) ethylidene]-1-cyclohexa-2,5-dienylidene]-[(3-sulfophenyl) methyl]azanium with a chemical structure of:

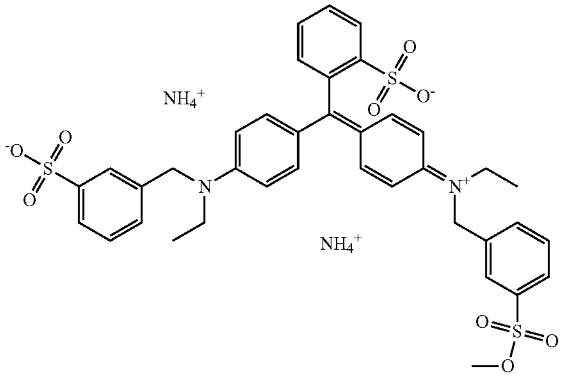

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

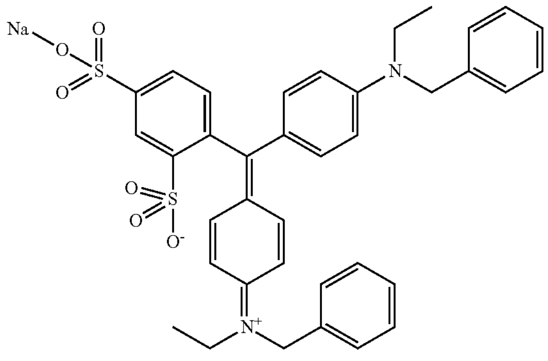

(commercially available as Acid Blue 7); and a phthalocyanine with a chemical structure of:

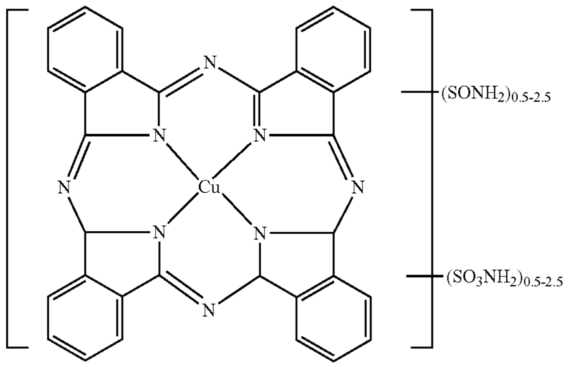

(commercially available as Direct Blue 199); and combinations thereof.

In an example of the detailing agent, the dye may be present in an amount ranging from about 1 wt % active to about 3 wt % active based on the total weight of the detailing agent. In another example of the detailing agent including a combination of dyes, one dye (e.g., the black dye) is present in an amount ranging from about 1.50 wt % active to about 1.75 wt % active based on the total weight of the detailing agent, and the other dye (e.g., the cyan dye) is present in an amount ranging from about 0.25 wt % active to about 0.50 wt % active based on the total weight of the detailing agent.

The balance of the detailing agent is water. As such, the amount of water may vary depending upon the amounts of the other components that are included.

Coloring Agent

The methods disclosed herein may also involve the selective application of a coloring agent. The coloring agent may be used to impart color to the 3D object.

In these examples, the coloring agent is separate from the fusing agent and the anti-microbial agent or from the combined anti-microbial/fusing agent. A separate coloring agent may be desirable because it can be applied separately from the other agent(s), thus allowing control over where color is added. The coloring agent may be applied during printing (e.g., on the build material composition with the fusing agent and the anti-microbial agent or with the combined anti-microbial/fusing agent) or after printing (e.g., on a 3D printed object) to impart a colored appearance to the 3D printed object.

The coloring agent may include a colorant, a co-solvent, and a balance of water. In some examples, the coloring agent of these components, and no other components. In still other examples, the coloring agent may further include additional components that aid in colorant dispersability and/or ink jettability. Some examples of additional coloring agent components include dispersant(s) (e.g., a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins), humectant(s), surfactant(s), anti-kogation agent(s), and/or anti-microbial(s) (examples of which are described herein in reference to the fusing agent).

The coloring agent may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color. While some examples have been provided, it is to be understood that other colored inks may also be used.

The colorant of the coloring agent may be any pigment or dye. When the coloring agent is a separate agent, the pigment or dye is to impart color, and is not meant to replace the energy absorber in the fusing agent. As such, the colorant may function as an energy absorber or as a partial energy absorber, or may not provide any anergy absorption.

An example of the pigment based colored ink may include from about 1 wt % active to about 10 wt % active of pigment(s), from about 10 wt % active to about 30 wt % active of co-solvent(s), from about 1 wt % active to about 10 wt % active of dispersant(s), 0.01 wt % active to about 1 wt % active of anti-kogation agent(s), from about 0.05 wt % active to about 0.1 wt % active anti-microbial(s), and a balance of water. An example of the dye based colored ink may include from about 1 wt % active to about 7 wt % active of dye(s), from about 10 wt % active to about 30 wt % active of co-solvent(s), from about 1 wt % active to about 7 wt % active of dispersant(s), from about 0.05 wt % active to about 0.1 wt % active anti-microbial(s), from 0.05 wt % active to about 0.1 wt % active of chelating agent(s), from about 0.005 wt % active to about 0.2 wt % active of buffer(s), and a balance of water.

Polymeric Build Material Composition

The build material composition includes a polymeric build material. Examples of suitable polymeric materials include a polyamide (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.), a polyolefin (e.g., polyethylene, polypropylene, etc.), a thermoplastic polyamide (TPA), a thermoplastic polyurethane (TPU), a styrenic block copolymer (TPS), a thermoplastic polyolefin elastomer (TPO), a thermoplastic vulcanizate (TPV), thermoplastic copolyester (TPC), a polyether block amide (PEBA), or a combination thereof.

In some examples, the polymeric build material may be in the form of a powder. In other examples, the polymeric build material may be in the form of a powder-like material, which includes, for example, short fibers having a length that is greater than its width. In some examples, the powder or powder-like material may be formed from, or may include, short fibers that may, for example, have been cut into short lengths from long strands or threads of material.

Within a distribution, the polymeric build material may be made up of similarly sized particles and/or differently sized particles. In an example, the average particle size (e.g., average diameter of the particles) of the polymeric build material ranges from about 0.5 μm to about 225 μm. In another example, the average particle size of the polymeric build material ranges from about 10 μm to about 130 μm. In some examples, the polymeric build material particles within the distribution can have a median diameter (D50) ranging from about 2 μm to about 150 μm, from about 1 μm to about 100 μm, from about 1 μm to about 50 μm, etc. In an example, the median value may be weighted by volume.

When the polymeric build material is a crystalline or semi-crystalline material, the polymer may have a wide processing window of greater than 5° C., which can be defined by the temperature range between the melting point and the re-crystallization temperature. In an example, the polymer may have a melting point ranging from about 35° C. to about 300° C. As other examples, the polymer may have a melting point ranging from about 155° C. to about 225° C., from about 155° C. to about 215° C., about 160° C. to about 200° C., from about 170° C. to about 190° C., or from about 182° C. to about 189° C. As still another example, the polymer may be a polyamide having a melting point of about 180° C. or a polypropylene having a melting point of about 160° C.

Other polymers do not have a melting point, but rather have a range of temperatures over which the polymers soften. In some examples, this softening temperature range is from about 130° C. to about 250° C.

In some examples, the polymeric build material does not substantially absorb radiation having a wavelength within the range of 300 nm to 405 nm. The phrase "does not substantially absorb" means that the absorptivity of the polymeric build material at a particular wavelength is 25% or less (e.g., 20%, 10%, 5%, etc.).

In some examples, in addition to the polymeric build material, the build material composition may include an antioxidant, an antistatic agent, a flow aid, or a combination thereof. While several examples of these additives are provided, it is to be understood that these additives are selected to be thermally stable (i.e., will not decompose) at the 3D printing temperatures.

Antioxidant(s) may be added to the build material composition to prevent or slow molecular weight decreases of the polymeric build material and/or to further prevent or slow discoloration (e.g., yellowing) of the composition by preventing or slowing oxidation of the polymeric particles. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are dry blended with the polymeric build material. In an example, the antioxidant may be included in the build material composition in an amount ranging from about 0.01 wt % active to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 μm. The flow aid improves the flowability of the build material composition by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

Sets and Kits

The anti-microbial agent disclosed herein may be part of a 3D printing kit with any example of the fusing agent (e.g., core, primer, and/or UV light) disclosed herein. In one example, the kit is a multi-fluid kit that includes the anti-microbial agent and one or more of the fusing agents (e.g., the core fusing agent and/or the primer fusing agent, or the UV light fusing agent). Examples of the multi-fluid kit may also include the detailing agent and/or the coloring agent. In another example, the kit is a 3D printing kit, which includes any example of the multi-fluid kit and the build material composition.

It is to be understood that the fluid(s) of the multi-fluid kits, or the fluid(s) and the build material composition of the 3D printing kits may be maintained separately until used together in examples of the 3D printing method disclosed herein. The fluid(s) and/or compositions may each be contained in one or more containers prior to and during printing, but may be combined together during printing. The containers can be any type of a vessel (e.g., a reservoir), box, or receptacle made of any material.

Printing Method

The anti-microbial agent disclosed herein may be used in a 3D printing method that utilizes the fusing agent. The 3D printing method generally includes applying a polymeric build material composition to form a build material layer; based on a digital 3D object model of the 3D object, selectively applying a fusing agent on at least a portion of the build material layer; based on the digital 3D object model, selectively applying an anti-microbial agent on the at least a portion of the build material layer, the agent including at least 3 wt % active, based on a total weight of the agent, of a paraben selected from the group consisting of methyl paraben, ethyl paraben, propyl paraben, butyl paraben, isopropyl paraben, isobutyl paraben, heptyl paraben, benzyl paraben, salts thereof, and combinations thereof, and an aqueous vehicle including up to 85 wt % active, based on the total weight of the agent, of a co-solvent packing including at least one co-solvent present in an amount sufficient to increase a solubility of the paraben in the aqueous vehicle and a balance of water; and exposing the build material layer to electromagnetic radiation to coalesce the at least the portion to form a layer of a 3D object that exhibits anti-microbial properties.

To form the 3D object, the method may be repeated. As such, the method may further include iteratively applying individual build material layers of the polymeric build material composition; based on the digital 3D object model, selectively applying the fusing agent and the anti-microbial agent to at least some of the individual build material layers to define individually patterned layers; and iteratively exposing the individually patterned layers to the electromagnetic radiation to form individual object layers.

An example of the 3D object (i.e., 3D printed article) disclosed herein includes coalesced polymeric build material; and at least 0.1 wt %, based on a total weight of the 3D printed article, of a paraben selected from the group consisting of methyl paraben, ethyl paraben, propyl paraben, butyl paraben, isopropyl paraben, isobutyl paraben, heptyl paraben, benzyl paraben, salts thereof, and combinations thereof.

Some examples of the 3D printed article also include the flow aid present in an amount up to 0.2 wt % based on the total weight of the 3D printed article, and/or any other build material composition additives set forth herein. The 3D printed article may also include the radiation absorbing material intermingled with the coalesced build material, wherein the energy absorber: exhibits absorption at least at some wavelengths within a range of from 100 nm to 4000 nm; or exhibits absorption at wavelengths ranging from 100 nm to 400 nm or 800 nm to 4000 nm and has transparency at wavelengths ranging from 400 nm to 780 nm. The amount of the radiation absorbing material in the 3D printed article will depend upon the amount of the radiation absorbing material in the fusing agent as well as the volume of the fusing agent that is applied to each of the layers of the build material composition.

The 3D printed article may also include the coloring agent applied on an exterior of the 3D printed article or incorporated into at least a portion of the coalesced build material, the coloring agent being selected from the group consisting of a black agent, a cyan agent, a magenta agent, and a yellow agent.

Different examples of the 3D printing method are shown and described in reference to FIG. 1 through FIG. 4.

Prior to execution of any examples of the method, it is to be understood that a controller may access data stored in a data store pertaining to a 3D part/object that is to be printed. The data may include a digital model of the 3D part/object that is to be build, and additional data, for example, the number of layers of the build material composition that are to be formed, the locations at which any of the agents is/are to be deposited on each of the respective layers, etc. may be derived from this digital 3D object model.

Printing with One Fusing Agent

Referring now to FIG. 1, an example of a 3D printing method which utilizes one of the fusing agents is schematically depicted.

The method shown in FIG. 1 includes spreading the build material composition 11 to form a build material layer 12; based on a digital 3D object model, selectively applying a fusing agent (e.g., core fusing agent 14, primer fusing agent 14', UV light fusing agent 14") onto the build material layer 12, thereby forming a patterned portion 16; selectively applying an anti-microbial agent 10 on at least some of the patterned portion 16; and exposing the build material layer 12 to electromagnetic radiation EMR to selectively coalesce the patterned portion 16 and form a 3D printed object layer 18.

Prior to spreading, the method may further include applying the build material composition 11 to a build area platform 20 having an X-Y plane (at surface 21). In FIG. 1, the layer 12 of the build material composition 11 is formed on the build area platform 20. A printing system may be used to apply the build material composition 11. The printing system may include the build area platform 20, a build material supply 22 containing the build material composition 11, and a build material distributor 24.

The surface 21 of the build area platform 20 provides the X-Y plane for building the 3D printed object. The surface 21 receives the build material composition 11 from the build material supply 22. The build area platform 20 may be moved in the directions as denoted by the arrow 26, e.g., along the Z-axis, so that the build material composition 11 may be delivered to the build area platform 20 or to a previously formed layer. In an example, when the build material composition 11 is to be delivered, the build area platform 20 may be programmed to advance (e.g., downward) enough so that the build material distributor 24 can push the build material composition 11 onto the build area platform 20 to form a substantially uniform layer 12 of the build material composition 11 thereon. The build area platform 20 may also be returned to its original position, for example, when a new part is to be built.

The build material supply 22 may be a container, bed, or other surface that is to position the build material composition 11 between the build material distributor 24 and the build area platform 20. The build material supply 22 may include heaters so that the build material composition 11 is heated to a supply temperature ranging from about 25° C. to about 150° C. In these examples, the supply temperature may depend, in part, on the build material composition 11 used and/or the 3D printer used. As such, the range provided is one example, and higher or lower temperatures may be used.

The build material distributor 24 may be moved in the directions as denoted by the arrow 28, e.g., along the Y-axis, over the build material supply 22 and across the build area platform 20 to spread the layer 12 of the build material composition 11 over the build area platform 20. In this example, the spreading is performed in the Y-direction of the X-Y plane. The build material distributor 24 may also be returned to a position adjacent to the build material supply 22 following the spreading of the build material composition 11. The build material distributor 24 may be a blade (e.g., a doctor blade), a roller, a combination of a roller and a blade, and/or any other device capable of spreading the build material composition 11 over the build area platform 20. For instance, the build material distributor 24 may be a counter-rotating roller. In some examples, the build material supply 22 or a portion of the build material supply 22 may translate along with the build material distributor 24 such that build material composition 11 is delivered continuously to the build area platform 20 rather than being supplied from a single location at the side of the printing system as depicted in FIG. 1.

The build material supply 22 may supply the build material composition 11 into a position so that it is ready to be spread onto the build area platform 20. The build material distributor 24 may spread the supplied build material composition 11 onto the build area platform 20. The controller (not shown) may process "control build material supply" data, and in response, control the build material supply 22 to appropriately position the particles of the build material composition 11, and may process "control spreader" data, and in response, control the build material distributor 24 to spread the build material composition 11 over the build area platform 20 to form the layer 12. In FIG. 1, one build material layer 12 has been formed.

The layer 12 has a substantially uniform thickness across the build area platform 20. In an example, the build material layer 12 has a thickness ranging from about 50 μm to about 120 μm. In another example, the thickness of the build material layer 12 ranges from about 30 μm to about 300 μm. It is to be understood that thinner or thicker layers may also be used. For example, the thickness of the build material layer 12 may range from about 20 μm to about 500 μm. The layer thickness may be about 2× (i.e., 2 times) the average particle size (e.g., diameter) of the polyamide particles at a minimum for finer part definition. In some examples, the layer thickness may be about 1.2× the average diameter of the polyamide particles in the build material composition 11.

After the build material composition 11 has been applied and spread, and prior to further processing, the build material layer 12 may be exposed to pre-heating. In an example, the pre-heating temperature may be below the melting point or melting range of the polymeric build material particles in the build material composition 11. As examples, the pre-heating temperature may range from about 5° C. to about 50° C. below the melting point or the lowest temperature of the softening range of the polymeric material. In an example, the pre-heating temperature ranges from about 50° C. to about 205° C. In still another example, the pre-heating temperature ranges from about 100° C. to about 190° C. It is to be understood that the pre-heating temperature may depend, in part, on the build material composition 11 used. As such, the ranges provided are some examples, and higher or lower temperatures may be used.

Pre-heating the layer 12 may be accomplished by using any suitable heat source that exposes all of the build material composition 11 in the layer 12 to the heat. Examples of the heat source include a thermal heat source (e.g., a heater (not shown) integrated into the build area platform 20 (which may include sidewalls)) or a radiation source 30.

After the layer 12 is formed, and in some instances is pre-heated, the fusing agent 14 or 14' or 14" is selectively applied on at least some of the build material composition 11 in the layer 12 to form a patterned portion 16.

To form a layer 18 of a 3D printed object, at least a portion (e.g., patterned portion 16) of the layer 12 of the build material composition 11 is patterned with the fusing agent 14 or 14' or 14". Any of the core fusing agent 14, or the primer fusing agent 14', or the UV light fusing agent 14" may be used. When it is desirable to form a white, colored, or slightly tinted object layer 18, the primer fusing agent 14' or the UV light fusing agent 14" may be used to pattern the build material composition 11. The primer fusing agent 14' or the UV light fusing agent 14" is clear or slightly tinted (depending upon the energy absorber used), and thus the resulting 3D printed object layer 18 may appear white, lightly colored (e.g., yellow), or the color of the build material composition 11. When it is desirable to form a darker color or black object layer 18, the core fusing agent 14 may be used. The core fusing agent 14 is dark or black, and thus the resulting 3D printed object layer 18 may appear grey, black or another dark color. In other examples of the method (e.g., method shown in FIG. 2) the core and primer fusing agents 14 and 14' may be used to together to pattern different portions of a single build material layer 12, which will be described further in reference to FIG. 2. Color may also be added by using the coloring agent (not shown), which will also be described further in reference to FIG. 4.

The volume of the fusing agent 14 or 14' or 14" that is applied per unit of the build material composition 11 in the patterned portion 16 may be sufficient to absorb and convert enough electromagnetic radiation so that the build material composition 11 in the patterned portion 16 will coalesce/fuse. The volume of the fusing agent 14 or 14' or 14" that is applied per unit of the build material composition 11 may depend, at least in part, on the energy absorber used, the energy absorber loading in the fusing agent 14 or 14' or 14", and the type of polymeric particles in the build material composition 11.

The fusing agent 14 or 14' or 14" may be dispensed from an applicator 32. The applicator 32 may include a thermal inkjet printhead, a piezoelectric printhead, a continuous inkjet printhead, etc., and the selective application of the fusing agent 14 or 14' or 14" may be accomplished by thermal inkjet printing, piezo electric inkjet printing, continuous inkjet printing, etc. The controller may process data, and in response, control the applicator 32 to deposit the fusing agent 14 or 14' or 14" to generate the patterned portion(s) 16 of the build material composition 11.

It is to be understood that the selective application of the fusing agent 14 or 14' or 14" may be accomplished in a single printing pass or in multiple printing passes. In some examples, the fusing agent 14 or 14' or 14" is selectively applied in a single printing pass. In some other examples, the fusing agent 14 or 14' or 14" is selectively applied in multiple printing passes. In one of these examples, the number of printing passes ranging from 2 to 4. It may be desirable to apply the fusing agent 14 or 14' or 14" in multiple printing passes to increase the amount, e.g., of the energy absorber that is applied to the build material composition 11, to avoid liquid splashing, to avoid displacement of the build material composition 11, etc.

To impart anti-microbial properties to all or some of the layer 18 of the 3D printed object, at least some of the patterned portion 16 is further patterned with the anti-microbial agent 10. Any example of the anti-microbial agent 10 disclosed herein may be used.

The volume of the anti-microbial agent 10 that is applied per unit of the build material composition 11 in the patterned portion 16 may be sufficient to leave at least some of the paraben from the agent 10 in the 3D object layer 18 after solvent evaporation and build material coalescence take place. The volume of the anti-microbial agent 10 that is applied per unit of the build material composition 11 may depend, at least in part, on the paraben used, and the type of polymeric particles in the build material composition 11.

The anti-microbial agent 10 may be dispensed from an applicator 32'. The applicator 32' may include a thermal inkjet printhead, a piezoelectric printhead, a continuous inkjet printhead, etc., and the selective application of the anti-microbial agent 10 may be accomplished by thermal inkjet printing, piezo electric inkjet printing, continuous inkjet printing, etc. The controller may process data, and in response, control the applicator 32' to deposit the anti-microbial agent 10 onto some or all of the patterned portion (s) 16 of the build material composition 11.

It is to be understood that the selective application of the anti-microbial agent 10 may be accomplished in a single printing pass or in multiple printing passes. In some examples, the anti-microbial agent 10 is selectively applied in a single printing pass. In some other examples, the anti-microbial agent 10 is selectively applied in multiple printing passes. In one of these examples, the number of printing passes ranging from 2 to 4. It may be desirable to apply the anti-microbial agent 10 in multiple printing passes to increase the amount, e.g., of the paraben that is applied to the build material composition 11, to avoid liquid splashing, to avoid displacement of the build material composition 11, etc.

In one example of the method, the fusing agent 14, 14', 14" and the anti-microbial agent 10 are sequentially applied over multiple printing passes.

In the example shown in FIG. 1, a detailing agent 34 is also selectively applied to the portion(s) 36 of the layer 12. The portion(s) 36 are not patterned with the fusing agent 14 or 14' or 14" and thus are not to become part of the final 3D object layer 18. Thermal energy generated during radiation exposure may propagate into the surrounding portion(s) 36 that do not have the fusing agent 14 or 14' or 14" applied thereto. The detailing agent 34 inhibits the propagation of thermal energy, and thus helps to prevent the coalescence of the non-patterned build material portion(s) 38.

The detailing agent 34 may also be dispensed from an applicator 32". The applicator 32" may include any of the inkjet printheads set forth herein. It is to be understood that the applicators 32, 32', 32" may be separate applicators or may be a single applicator with several individual cartridges for dispensing the respective agents 14 or 14' or 14", 10, and 34. The detailing agent 34 may also be selectively applied in a single printing pass or in multiple printing passes.

After the agents 14 or 14' or 14", 10, and 34 are selectively applied in the specific portion(s) 16 and 36 of the layer 12, the entire layer 12 of the build material composition 11 is exposed to electromagnetic radiation (shown as EMR in FIG. 1).

The electromagnetic radiation is emitted from the radiation source 30. The length of time the electromagnetic radiation is applied for, or energy exposure time, may be dependent, for example, on one or more of: characteristics of the radiation source 30; characteristics of the build material composition 11; and/or characteristics of the fusing agent 14 or 14' or 14".

It is to be understood that the electromagnetic radiation exposure may be accomplished in a single radiation event or in multiple radiation events. In an example, the exposing of the build material composition 11 is accomplished in multiple radiation events. In a specific example, the number of radiation events ranges from 3 to 8. In still another specific example, the exposure of the build material composition 11 to electromagnetic radiation may be accomplished in 3 radiation events. It may be desirable to expose the build material composition 11 to electromagnetic radiation in multiple radiation events to counteract a cooling effect that may be brought on by the amount of the agents 14 or 14' or 14", 10, and 34 that is applied to the build material layer 12. Additionally, it may be desirable to expose the build material composition 11 to electromagnetic radiation in multiple radiation events to sufficiently elevate the temperature of the build material composition 11 in the portion(s) 16, 36, without over heating the build material composition 11 in the non-patterned portion(s) 36.

The fusing agent 14 or 14' or 14" enhances the absorption of the radiation, converts the absorbed radiation to thermal energy, and promotes the transfer of the thermal heat to the build material composition 11 in contact therewith. In an example, the fusing agent 14 or 14' or 14" sufficiently elevates the temperature of the build material composition 11 in the patterned portion 16 to a temperature above the melting point or above the lowest temperature of the softening range of the polymeric build material particles, allowing coalescing/fusing (e.g., thermal merging, melting, binding, etc.) of the build material composition 11 to take place. The application of the electromagnetic radiation forms the 3D printed object layer 18.

In some examples, the electromagnetic radiation has a wavelength ranging from 100 nm to 400 nm, from 400 nm to 4000 nm, or from 800 nm to 1400 nm, or from 800 nm to 1200 nm. The radiation used will depend upon the fusing agent 14 or 14' or 14" that is used. Radiation having wavelengths within the appropriate ranges may be absorbed by the fusing agent 14 or 14' or 14" and may heat the build material composition 11 in contact therewith, and may not be absorbed by the non-patterned build material composition 11 in portion(s) 36.

The 3D printed object layer 18 exhibits anti-microbial properties at any area that corresponds to the area of the patterned portion 16 where the anti-microbial agent 10 had been applied.

After the 3D printed object layer 18 is formed, additional layer(s) may be formed thereon to create an example of the 3D printed object. To form the next layer, additional build material composition 11 may be applied on the layer 18. The fusing agent 14 or 14' or 14" and the anti-microbial agent 10 are then independently and selectively applied on at least a portion of the additional build material composition 11, according to respective data derived from the digital 3D object model. The detailing agent 34 may be applied in any area of the additional build material composition 11 where coalescence is not desirable. After the agent(s) 14 or 14' or 14", 10, and 34 is/are applied, the entire layer of the additional build material composition 11 is exposed to electromagnetic radiation in the manner described herein. The application of additional build material composition 11, the selective application of the agent(s) 14 or 14' or 14", 10, and 34, and the electromagnetic radiation exposure may be repeated a predetermined number of cycles to form the final 3D printed object in accordance with the digital 3D object model.

Printing with the Core and Primer Fusing Agents

Figure 2:
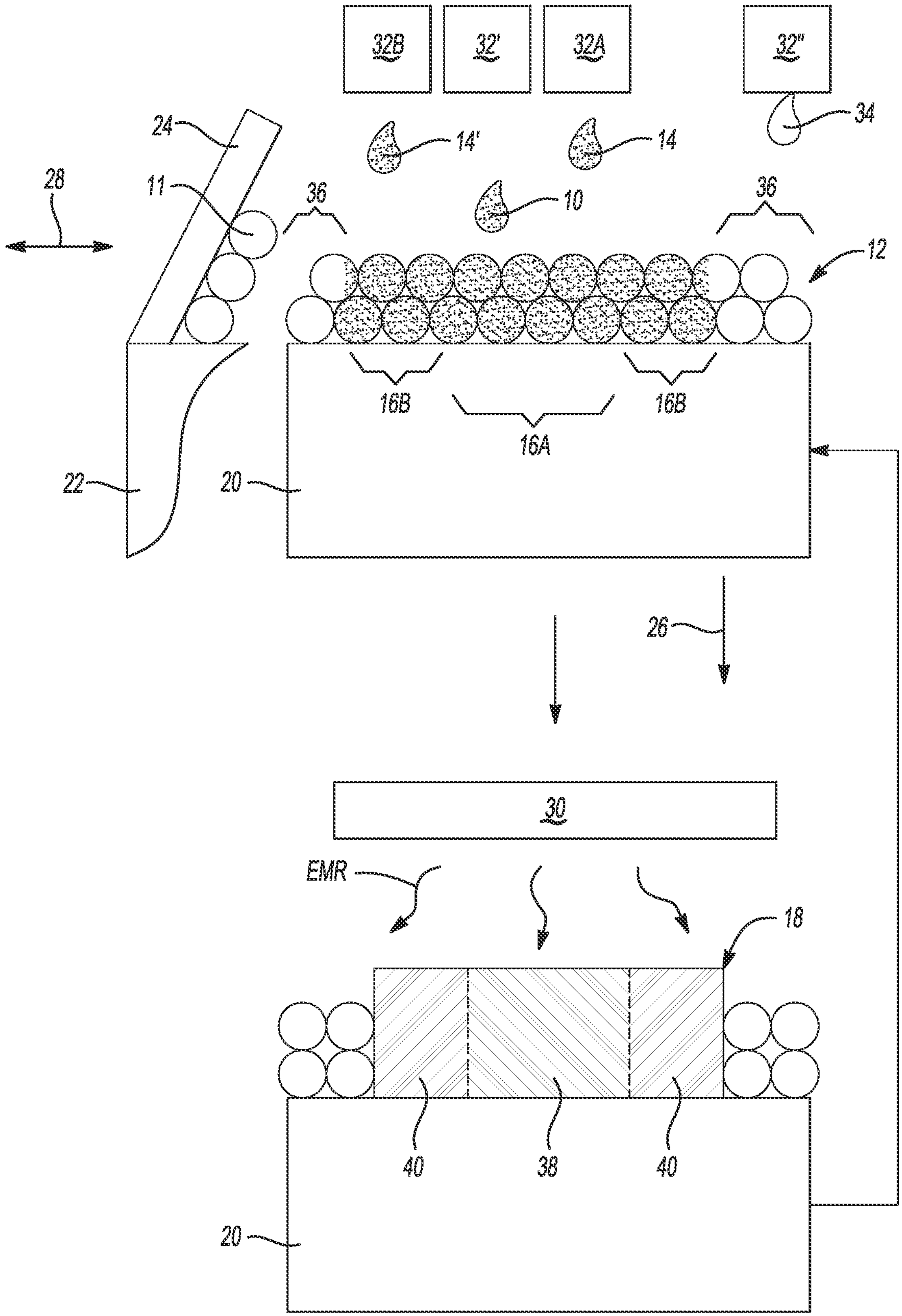
FIG. 2 is a schematic diagram illustrating another example 3D printing technique.

Referring now to FIG. 2, an example of the 3D printing method with both of the fusing agents 14 and 14' is depicted.

The method shown in FIG. 2 includes spreading a build material composition 11 to form a build material layer 12; based on data derived from a digital 3D object model, selectively applying a core fusing agent 14 onto the build material layer 12, thereby forming a first patterned portion 16A; based on the data derived from the digital 3D object model, selectively applying a primer fusing agent 14' onto the build material layer 12, thereby forming a second patterned portion 16B adjacent to the first patterned portion 16A; based on the data derived from the digital 3D object model, selectively applying an anti-microbial agent 10 onto the first and/or second patterned portions 16A and/or 16B; and exposing the build material layer 12 to electromagnetic radiation EMR to selectively coalesce the patterned portions 16A and 16B and form a 3D printed object layer 18'.

The build material composition 11 may be applied and spread as described in reference to FIG. 1. As shown in FIG. 2, one layer 12 of the build material composition 11 is applied and spread on the build area platform 20. After the build material composition 11 has been applied and spread, and prior to further processing, the build material layer 12 may be exposed to pre-heating as described in reference to FIG. 1.

In this example of the 3D printing method, the core fusing agent 14 is selectively applied on at least some of the build material composition 11 in the layer 12 to form a first patterned portion 16A; and the primer fusing agent(s) 14' is selectively applied on at least some of the build material composition 11 in the layer 12 to form second patterned portion(s) 16B that are adjacent to the first patterned portion(s) 16A. In one example, the first patterned portion 16A (patterned with the core fusing agent 14) may be located at an interior portion of the build material layer 12 to impart mechanical strength, and the second patterned portion 16B (patterned with the primer fusing agent 14') may be located at an exterior portion of the build material layer 12 to mask the color of the first patterned portion 16A.

The volume of the core fusing agent 14 that is applied per unit of the build material composition 11 in the first patterned portion 16A may be sufficient to absorb and convert enough electromagnetic radiation so that the build material composition 11 in the patterned portion 16A will coalesce/fuse.

The volume of the primer fusing agent 14' that is applied per unit of the build material composition 11 in the second patterned portion 16B may be sufficient to absorb and convert enough electromagnetic radiation so that the build material composition 11 in the second patterned portion 16B will coalesce/fuse.

The anti-microbial agent 10 may be selectively applied to some or all of the first patterned portion 16A and/or to some or all of the second patterned portion 16B. The selective application of the anti-microbial agent 10 may be performed in the manner described in reference to FIG. 1. The anti-microbial agent 10 may be selectively applied wherever it is desirable to impart anti-microbial properties to the resulting 3D printed object layer 18'.

In the example shown in FIG. 2, the detailing agent 34 is also selectively applied to the portion(s) 36 of the layer 12. The portion(s) 36 are not patterned with the fusing agent 14 or 14' and thus are not to become part of the final 3D printed object layer 18'.

After the agents 14, 14', 10, and 34 are selectively applied in the specific portion(s) 16A, 16B, and 36 of the layer 12, the entire layer 12 of the build material composition 11 is exposed to electromagnetic radiation (shown as EMR in FIG. 2). Radiation exposure may be accomplished as described in reference to FIG. 1.

In this example, the respective fusing agents 14 and 14' enhance the absorption of the radiation, convert the absorbed radiation to thermal energy, and promote the transfer of the thermal heat to the build material composition 11 in contact therewith. In an example, the fusing agents 14 and 14' sufficiently elevate the temperature of the build material composition 11 in the respective portions 16A, 16B to a temperature above the melting point of the polymeric build material particles, allowing coalescing/fusing (e.g., thermal merging, melting, binding, etc.) of the build material composition 11 to take place. The application of the electromagnetic radiation forms the 3D printed object layer 18', which, in this example, includes a core portion 38 and primer portions 40 at opposed ends of the core portion 38.

FIG. 2 illustrates one example of how the core fusing agent 14 and the primer fusing agent 14' may be used together to pattern a single build material layer 12 and form one layer 18' of the 3D printed object.

Figure 3:
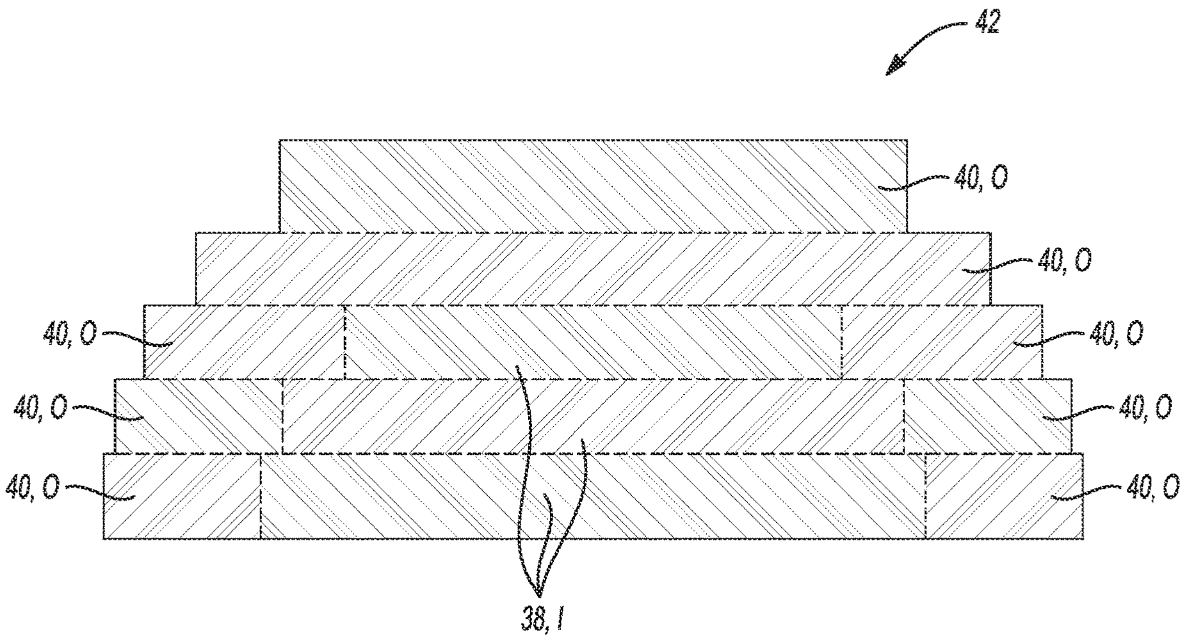
FIG. 3 is a schematic, cross-sectional view, taken in the Y-Z plane, of an example of a 3D printed object printed from the bottom to the top on a build area platform having an X-Y plane.

FIG. 3 is a cross-section of a 3D printed object 42 that can be formed with both the core fusing agent 14 and the primer fusing agent 14'. In this example, the 3D printed object 42 includes a predetermined number core portions 38, and a predetermined number of primer portions 40. To form this example of the 3D printed object 42, the core fusing agent 14 would be applied on multiple layers of the build material composition 11 (illustrated by the dashed horizontal lines in FIG. 3) to pattern and ultimately form the inner core portion 38, I of the 3D printed object 42, and the primer fusing agent 14' would be applied on multiple layers of the build material composition 11 to pattern and ultimately form the outermost primer portions 40, O of the 3D printed object 42. After each build material layer 12 is patterned with the agent(s) 14, 14', electromagnetic radiation may be applied to solidify the respective patterned build material layers. The anti-microbial agent 10 may also be applied to the build material layers 12 to impart anti-microbial properties to the inner core portion 38, I and/or the outermost primer portions 40, O.

Figure 4:
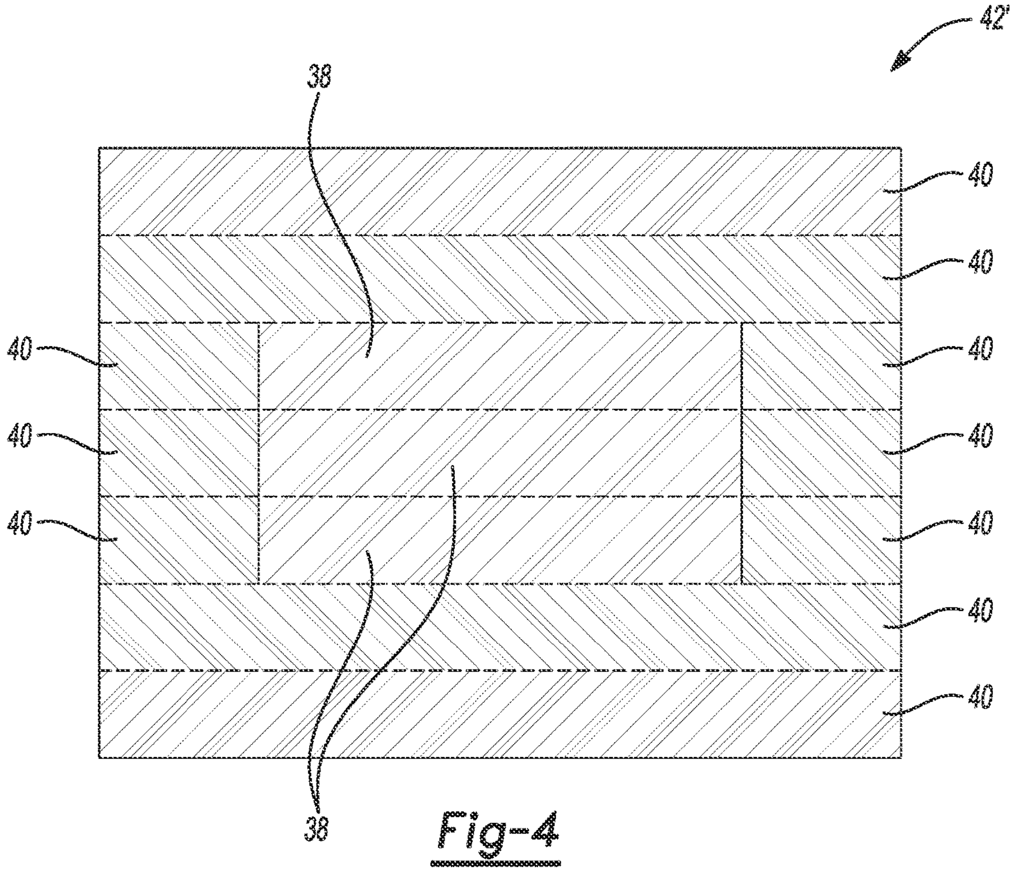
FIG. 4 is a schematic, cross-sectional view, taken in the Y-Z plane, of another example of a 3D printed object printed from the bottom to the top on a build area platform having an X-Y plane.

FIG. 4 is a cross-section of another 3D printed object 42' that can be formed with both the core fusing agent 14 and the primer fusing agent 14'. In this example, the core fusing agent 14 is utilized to form the core (e.g., the center or inner-most portion) of the 3D printed object 42', and the primer fusing agent 14' is used to form the outermost layers of the 3D printed object 42'. The core fusing agent 14 can impart strength to the core of the 3D printed object 42', while the primer fusing agent 14' enables white or a color to be exhibited at the exterior of the 3D printed object 42'.

To form this example of the 3D printed object 42', the outermost build material layer(s) and the outermost edges of the middle build material layers would be patterned with the primer fusing agent 14' to form primer portions 40 of the 3D printed object 42'. The innermost portions of the middle build material layers would be patterned with the core fusing agent 14 to form the core portions 38 of the 3D printed object 42'. In this example, any number of core portions 38 may be formed, and any number of primer portions 40 may be formed. The anti-microbial agent 10 may also be applied to the build material layers 12 to impart anti-microbial properties to the core portions 38 and/or the primer portions 40.

While several variations of the 3D printed objects 42, 42' and the combination of the cores and primer fusing agents 14, 14' have been described, it is to be understood that any of the fusing agents 14, 14', 14" may be used to form any desirable 3D printed object. Additionally, the anti-microbial agent 10 may be applied to in any desirable manner to impart the anti-microbial properties to the 3D printed objects 42, 42'.

In any of the example 3D printing methods that utilize the fusing agent(s) 14, 14', 14", the coloring agent (not shown) may also be applied with the primer fusing agent 14' or the UV light fusing agent 14" to generate color at the exterior surfaces of the 3D printed object, such as object 42 or object 42'. In these examples, the colorant of the coloring agent becomes embedded throughout the coalesced/fused build material composition wherever it is applied. In an example, the coloring agent may be applied with the primer fusing agent 14' on the portions of the build material layers that form the primer portions 40 in FIG. 4. Since the primer fusing agent 14' is clear or slightly tinted and the build material composition 12 is white or off-white, the color of the coloring agent will be the color of the resulting primer portions 40. Similarly, since the UV light fusing agent 14" is clear or slightly tinted and the build material composition 12 is white or off-white, the coloring agent may be used with this fusing agent 14" to impart color at desirable portions of the resulting 3D printed object.

When core and primer portions 38, 40 are formed (FIG. 3 and FIG. 4) and the coloring agent is used, it is to be understood that some of the primer portions 40 directly adjacent to the core portions 40 may be left uncolored. In this example, the uncolored primer portions 40 are white or slightly tinted, and may function as intermediate layers that help to form a mask over the black (or dark colored) core layers 38. The presence of uncolored primer portions 40 between core portions 38 and primer portions 40 that are colored with the coloring agent may help to optically isolate the core layers 38.

Additionally, in the examples disclosed herein, the 3D printed object 42, 42' may be printed in any orientation with respect to the X-Y plane of the build area platform 20, and thus with respect to the layers 12 of the build material composition 11. For example, the 3D printed object 42, 42' can be printed from bottom to top in the Z-direction, or at an inverted orientation (e.g., from top to bottom) in the Z-direction. For another example, the 3D printed object 42, 42' can be printed at an angle or on its side. The orientation of the build within the build material composition 11 can be selected in advance or even by the user at the time of printing, for example.

In still other examples of the method, the fusing agent and the anti-microbial agent are a combined agent (i.e., the anti-microbial/fusing agent), and the selective application occurs simultaneously.

To further illustrate the present disclosure, an example is given herein. It is to be understood that this example is provided for illustrative purposes and is not to be construed as limiting the scope of the present disclosure.

EXAMPLE

Three examples of the anti-microbial agent (AM Agents 1, 2, 3) were prepared. The formulations of each of the anti-microbial agents are shown in Table 1, with the amounts representing the wt % active.

TABLE 1

| Component Type | Specific Component | AM Agent 1 | AM Agent 2 | AM Agent 3 |
|---|---|---|---|---|
| Paraben | Methyl paraben | 3 | 6 | 12 |
| Co-Solvent | Ethanol | 10 | 10 | 10 |
| Package | Propylene glycol | 40 | 40 | 40 |
| | 2-phenoxyethanol | 2 | 2 | 2 |
| Surfactant | TERGITOL ™ 15-S-9 | 0.8 | 0.8 | 0.8 |
| Water | Deionized water | Balance | Balance | Balance |

The jettability performance of each of the anti-microbial agent (AM Agent 1, AM Agent 2, AM Agent 3) was tested using a decap test. For this test, a small amount of magenta dye was added to the example anti-microbial agents.

The term "decap performance," as referred to herein, means the ability of the agent to readily eject from the printhead, upon prolonged exposure to air. The decap time is measured as the amount of time that a printhead may be left uncapped (i.e., exposed to air) before the printer nozzles no longer fire properly, potentially because of clogging, plugging, or retraction of the colorant from the drop forming region of the nozzle/firing chamber. To test the decap performance, a reference line of each agent was printed from a thermal inkjet printer whose printhead was not uncapped (i.e., was not exposed to air). Then, the printhead was filled with the respective agent and left uncapped (i.e., exposed to air) for a predetermined amount of time (e.g., up to 16 seconds) before the agent was ejected again from the printhead. Each agent exhibited good decap out to 16 seconds, indicating high quality firing of the nozzles and minimal clogging, plugging, or retraction of the agent from the drop forming region of the nozzle/firing chamber.

All of the anti-microbial agents were used to print dog bone shaped 3D objects (Type V dog bones). The dog bone shaped 3D objects were generated using a polyamide-12 build material composition, a fusing agent (that included carbon black as the radiation absorbing material), and the respective anti-microbial agents. A control dog bone shaped 3D object was generated with the fusing agent and without the anti-microbial agent.

All of the dog bone shaped 3D object were printed on a small testbed 3D printer with the build material composition being spread in the Y-direction to layer thicknesses of 80 μm. For the control and example 3D objects, the fusing agent was printed over 2 passes in the X-direction. For the example 3D objects, the respective anti-microbial agent was printed in the same portion as the fusing agent over 2 passes in the X-direction. After the agent(s) was/were dispensed, the entire build area platform was exposed to near-infrared energy. The process was repeated until the entire object was formed. All of the dog bone shaped 3D objects were allowed to cool to room temperature, and then were cleaned using bead blasting.

Figure 5:
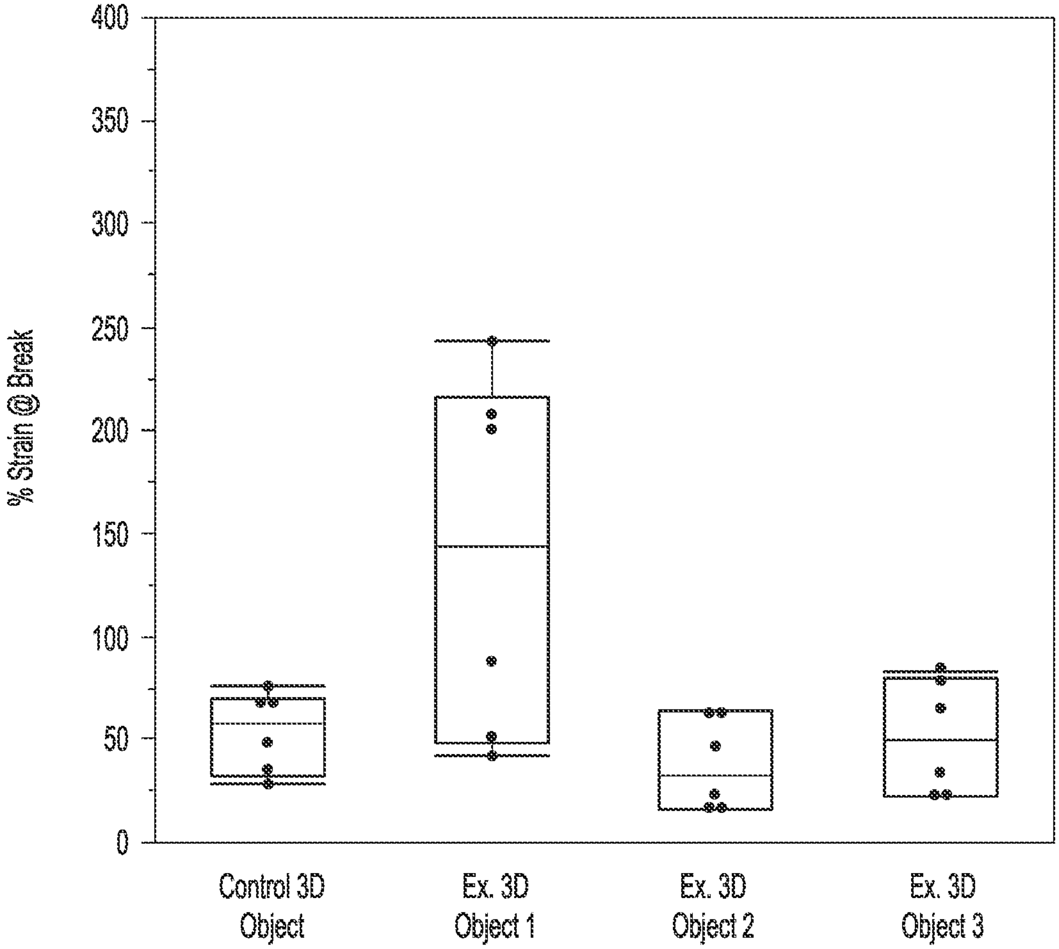
FIG. 5 is a graph depicting the % Strain at break of a control 3D object printed with no anti-microbial agent, and three 3D objects printed with three different anti-microbial agents.

The % strain at break of each of the example and control dog bone shaped 3D objects was measured using Instron testing equipment. The results are shown in FIG. 5, which depicts the % strain at break for the control example (no anti-microbial agent), Ex. 3D object 1 (formed with AM Agent 1), Ex. 3D object 2 (formed with AM Agent 2), and Ex. 3D object 3 (formed with AM Agent 3). These results illustrate that the mechanical properties of the 3D objects formed with an anti-microbial agent are as good or better than a control 3D object formed without an anti-microbial agent. AM Agent 1 had the biggest impact on the mechanical property, indicating that a smaller amount of paraben may improve mechanical strength.

The antimicrobial properties of the example 3D objects were not tested. At the paraben loading in each of the example anti-microbial agents, at least 0.2 wt % of the paraben should be present in the example 3D objects. This level of paraben provides significant antimicrobial resistance against a variety of different bacteria strains, such as *Escherichia coli, Staphylococcus aureus, Candida albicans, Pseudomonas aeruginosa*, and *Aspergillus niger*.

It is to be understood that the ranges provided herein include the stated range and any value or sub-range within the stated range, as if the value(s) or sub-range(s) within the stated range were explicitly recited. For example, a range from about 3 wt % active to about 15 wt % active, should be interpreted to include not only the explicitly recited limits of from about 3 wt % active to about 15 wt % active, but also to include individual values, such as about 3.75 wt % active, 8 wt % active, 11 wt % active, 14.5 wt % active, etc., and sub-ranges, such as from about 5 wt % active to about 15 wt % active, from about 3 wt % active to about 10 wt % active, from about 4 wt % active to about 14 wt % active, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An anti-microbial agent for three-dimensional (3D) printing, comprising:

at least 3 wt % active, based on a total weight of the anti-microbial agent, of a paraben selected from the group consisting of methyl paraben, ethyl paraben, propyl paraben, butyl paraben, isopropyl paraben, isobutyl paraben, heptyl paraben, benzyl paraben, salts thereof, and combinations thereof; and an aqueous vehicle including:

up to 85 wt % active, based on the total weight of the anti-microbial agent, of a co-solvent package including at least one co-solvent present in an amount sufficient to increase a solubility of the paraben in the aqueous vehicle; and a balance of water.

2. The anti-microbial agent as defined in claim 1 wherein the paraben is present in an amount ranging from at least 3 wt % active to about 15 wt % active based on the total weight of the anti-microbial agent.

3. The anti-microbial agent as defined in claim 1 wherein the at least one co-solvent consists of a phenol ether and an alcohol.

4. The anti-microbial agent as defined in claim 3 wherein:

the phenol ether is 2-phenoxyethanol or 2-phenylethanol present in an amount ranging from at least 0.5 wt % active to about 3 wt % active based on the total weight of the anti-microbial agent; and the alcohol is selected from the group consisting of propylene glycol, glycerol, polyethylene glycol, and a diol, and is present in an amount ranging from about 5 wt % active to about 80 wt % active, based on the total weight of the anti-microbial agent.

5. The anti-microbial agent as defined in claim 3 wherein:

the phenol ether is 2-phenoxyethanol or 2-phenylethanol present in an amount ranging from at least 0.5 wt % active to about 3 wt % active based on the total weight of the anti-microbial agent;

the alcohol consists of a first alcohol and a second alcohol;

the first alcohol is selected from the group consisting of methanol, ethanol, and glycerol present in an amount ranging from about 5 wt % active to about 10 wt % active, based on the total weight of the anti-microbial agent; and the second alcohol is propylene glycol present in an amount ranging from about 5 wt % active to about 75 wt % active, based on the total weight of the anti-microbial agent.

6. The anti-microbial agent as defined in claim 3 wherein:

the phenol ether is 2-phenoxyethanol or 2-phenylethanol present in an amount ranging from at least 1 wt % active to about 3 wt % active based on the total weight of the anti-microbial agent;

the alcohol consists of a first alcohol and a second alcohol;

the first alcohol is ethanol present in an amount ranging from about 5 wt % active to about 10 wt % active, based on the total weight of the anti-microbial agent; and the second alcohol is propylene glycol present in an amount ranging from about 30 wt % active to about 50 wt % active, based on the total weight of the anti-microbial agent.

7. The anti-microbial agent as defined in claim 1, further comprising a surfactant.

8. The anti-microbial agent as defined in claim 1, further comprising a radiation absorbing material.

9. The anti-microbial agent as defined in claim 8 wherein the radiation absorbing material is selected from the group consisting of an infrared radiation absorbing material and an ultraviolet radiation absorbing material.

10. The anti-microbial agent as defined in claim 1 wherein the anti-microbial agent consists of the paraben, the aqueous vehicle, an optional surfactant, and an optional radiation absorbing material.

11. A method for three-dimensional (3D) printing, comprising:

applying a polymeric build material composition to form a build material layer;

based on a digital 3D object model of the 3D object, selectively applying a fusing agent on at least a portion of the build material layer;

based on the digital 3D object model, selectively applying an anti-microbial agent on the at least a portion of the build material layer, the anti-microbial agent including:

at least 3 wt % active, based on a total weight of the anti-microbial agent, of a paraben selected from the group consisting of methyl paraben, ethyl paraben, propyl paraben, butyl paraben, isopropyl paraben, isobutyl paraben, heptyl paraben, benzyl paraben, salts thereof, and combinations thereof; and an aqueous vehicle including:

up to 85 wt % active, based on the total weight of the anti-microbial agent, of a co-solvent package including at least one co-solvent present in an amount sufficient to increase a solubility of the paraben in the aqueous vehicle; and a balance of water; and exposing the build material layer to electromagnetic radiation to coalesce the at least the portion to form a layer of a 3D object that exhibits anti-microbial properties.

12. The method as defined in claim 11 wherein the fusing agent and the anti-microbial agent are a combined agent and the selective application occurs simultaneously.

13. The method as defined in claim 11 wherein the fusing agent and the anti-microbial agent are sequentially applied over multiple printing passes.

14. The method as defined in claim 11, further comprising:

iteratively applying individual build material layers of the polymeric build material composition;

based on the digital 3D object model, selectively applying the fusing agent and the anti-microbial agent to at least some of the individual build material layers to define individually patterned layers; and iteratively exposing the individually patterned layers to the electromagnetic radiation to form individual object layers.

15. A 3D printed article, comprising:

coalesced polymeric build material; and at least 0.1 wt %, based on a total weight of the 3D printed article, of a paraben selected from the group consisting of methyl paraben, ethyl paraben, propyl paraben, butyl paraben, isopropyl paraben, isobutyl paraben, heptyl paraben, benzyl paraben, salts thereof, and combinations thereof.

* * * * *